US008962518B2

(12) United States Patent
Okamura et al.

(10) Patent No.: US 8,962,518 B2
(45) Date of Patent: Feb. 24, 2015

(54) CATALYST FOR PRODUCTION OF HYDROGEN AND PROCESS FOR PRODUCING HYDROGEN USING THE CATALYST, AND CATALYST FOR COMBUSTION OF AMMONIA, PROCESS FOR PRODUCING THE CATALYST AND PROCESS FOR COMBUSTING AMMONIA USING THE CATALYST

(75) Inventors: Junji Okamura, Himeji (JP); Masanori Yoshimune, Suita (JP); Masaru Kirishiki, Suita (JP); Hideaki Tsuneki, Suita (JP); Shinya Kitaguchi, Himeji (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 13/257,062

(22) PCT Filed: Mar. 17, 2010

(86) PCT No.: PCT/JP2010/054560
§ 371 (c)(1),
(2), (4) Date: Sep. 16, 2011

(87) PCT Pub. No.: WO2010/107065
PCT Pub. Date: Sep. 23, 2010

(65) Prior Publication Data
US 2012/0015802 A1 Jan. 19, 2012

(30) Foreign Application Priority Data

Mar. 17, 2009 (JP) ................................. 2009-064879
Mar. 17, 2009 (JP) ................................. 2009-064886
Mar. 17, 2009 (JP) ................................. 2009-064900
Mar. 17, 2009 (JP) ................................. 2009-064910

(51) Int. Cl.
*B01J 23/00* (2006.01)
*B01J 23/10* (2006.01)
(Continued)

(52) U.S. Cl.
CPC ............... *B01J 23/83* (2013.01); *B01J 23/002* (2013.01); *B01J 23/34* (2013.01); *B01J 23/44* (2013.01);
(Continued)

(58) Field of Classification Search
USPC .................... 502/300–355; 423/648.1, 658.2
See application file for complete search history.

(56) References Cited

U.S. PATENT DOCUMENTS 4,982,041 A * 1/1991 Campbell ..................... 585/500
5,055,282 A 10/1991 Shikada et al.
(Continued)

FOREIGN PATENT DOCUMENTS

EP      0 437 608        7/1991
EP      1118383 A1 *   7/2001
(Continued)

OTHER PUBLICATIONS

Chinese Office Action issued Mar. 21, 2013 in Chinese Application No. 201080010932.4, with English translation thereof.
(Continued)

*Primary Examiner* — Anthony J Zimmer
(74) *Attorney, Agent, or Firm* — Wenderoth, Lind & Ponack, L.L.P.

(57) ABSTRACT

Disclosed is a catalyst which can be used in the process for producing hydrogen by decomposing ammonia, can generate heat efficiently in the interior of a reactor without requiring excessive heating the reactor externally, and can decompose ammonia efficiently and steadily by utilizing the heat to produce hydrogen. Also disclosed is a technique for producing hydrogen by decomposing ammonia efficiently utilizing the catalyst. Specifically disclosed is a catalyst for use in the production of hydrogen, which is characterized by comprising an ammonia-combusting catalytic component and an ammonia-decomposing catalytic component. Also specifically disclosed is a catalyst for use in the production of hydrogen, which is characterized by comprising at least one metal element selected from the group consisting of cobalt, iron, nickel and molybdenum.

6 Claims, 3 Drawing Sheets

(51) Int. Cl.

| | | |
|---|---|---|
| B01J 23/32 | (2006.01) | |
| B01J 23/70 | (2006.01) | |
| B01J 23/74 | (2006.01) | |
| B01J 23/83 | (2006.01) | |
| B01J 23/34 | (2006.01) | |
| B01J 23/44 | (2006.01) | |
| B01J 23/50 | (2006.01) | |
| B01J 23/68 | (2006.01) | |
| B01J 23/882 | (2006.01) | |
| B01J 23/889 | (2006.01) | |
| B01J 23/89 | (2006.01) | |
| B01J 35/00 | (2006.01) | |
| B01J 35/10 | (2006.01) | |
| B01J 37/02 | (2006.01) | |
| B01J 37/03 | (2006.01) | |
| C01B 3/04 | (2006.01) | |
| C01B 3/06 | (2006.01) | |
| B01J 21/04 | (2006.01) | |
| B01J 23/42 | (2006.01) | |

(52) U.S. Cl.
CPC ............ *B01J 23/50* (2013.01); *B01J 23/688* (2013.01); *B01J 23/882* (2013.01); *B01J 23/8892* (2013.01); *B01J 23/8986* (2013.01); *B01J 35/0006* (2013.01); *B01J 35/002* (2013.01); *B01J 35/1014* (2013.01); *B01J 37/0201* (2013.01); *B01J 37/031* (2013.01); *C01B 3/047* (2013.01); *C01B 3/06* (2013.01); *B01J 21/04* (2013.01); *B01J 23/42* (2013.01); *B01J 2523/00* (2013.01); *C01B 2203/1041* (2013.01); *C01B 2203/1047* (2013.01); *C01B 2203/1058* (2013.01); *Y02E 60/364* (2013.01)
USPC ........... 502/303; 502/304; 502/324; 502/325; 502/337; 502/338

(56) References Cited

U.S. PATENT DOCUMENTS

| | | | | |
|---|---|---|---|---|
| 5,093,301 | A | * | 3/1992 | Chu et al. ............... 502/303 |
| 6,458,741 | B1 | * | 10/2002 | Roark et al. ............ 502/303 |
| 2002/0028171 | A1 | | 3/2002 | Goetsch et al. |
| 2003/0232224 | A1 | | 12/2003 | Kordesch et al. |
| 2004/0154223 | A1 | | 8/2004 | Powell et al. |
| 2005/0037244 | A1 | | 2/2005 | Goetsch et al. |
| 2005/0172556 | A1 | | 8/2005 | Powell et al. |
| 2005/0281735 | A1 | | 12/2005 | Chellappa et al. |
| 2006/0112636 | A1 | | 6/2006 | Chellappa et al. |
| 2006/0233700 | A1 | | 10/2006 | Chellappa et al. |
| 2008/0095682 | A1 | * | 4/2008 | Kharas et al. ........... 423/239.1 |
| 2010/0068132 | A1 | | 3/2010 | Vencill et al. |
| 2011/0283960 | A1 | | 11/2011 | Hikazudani et al. |

FOREIGN PATENT DOCUMENTS

| | | | |
|---|---|---|---|
| JP | 28-5309 | | 10/1953 |
| JP | 64/56301 | | 3/1989 |
| JP | 1-119341 | | 5/1989 |
| JP | 2-198639 | | 8/1990 |
| JP | 5-330802 | | 12/1993 |
| JP | 6-335618 | | 12/1994 |
| JP | 9-276700 | | 10/1997 |
| JP | 9-313940 | | 12/1997 |
| JP | 09313940 A | * | 12/1997 |
| JP | 2000-140640 | | 5/2000 |
| JP | 2001-104781 | | 4/2001 |
| JP | 2001-300314 | | 10/2001 |
| JP | 2004-307326 | | 11/2004 |
| JP | 2007-313410 | | 12/2007 |
| JP | 2008-536795 | | 9/2008 |
| JP | 2010-121509 | | 6/2010 |
| JP | 2010-180098 | | 8/2010 |
| JP | 2010-207783 | | 9/2010 |
| RU | 2100068 C1 | * | 12/1997 |
| RU | 2 185 237 | | 7/2002 |
| RU | 2185237 C1 | * | 7/2002 |
| WO | 01/87770 | | 11/2001 |
| WO | 02/08117 | | 1/2002 |
| WO | 02/071451 | | 9/2002 |
| WO | 02/086987 | | 10/2002 |
| WO | 2006/113451 | | 10/2006 |
| WO | 2006/113680 | | 10/2006 |
| WO | 2008/024089 | | 2/2008 |

OTHER PUBLICATIONS

International Search Report issued Jun. 15, 2010 in International (PCT) Application No. PCT/JP2010/054560.
T. Muroi, "Industrial Noble Metal Catalysts", p. 297, May 26, 2003 (partial English translation).
J. Engbaek, "Ammonia Cracker for Hydrogen Generation for PEM Application", pp. 3-6, online, Sep. 30, 2008.
Office Action dated Nov. 29, 2013 in corresponding Chinese Application No. 201080010932.4, with English translation thereof.
Office Action issued Oct. 29, 2013 in corresponding Japanese Application No. 2010-059897, with English translation thereof.
Office Action issued Oct. 29, 2013 in corresponding Japanese Application No. 2010-059900, with English translation thereof.
Decision of Rejection dated Feb. 12, 2014 in corresponding Japanese Application No. 2010-059897, with its English translation.
Notice for Reasons for Rejection dated Mar. 11, 2014 in corresponding Japanese Application No. 2010-059898, with its English translation.
Office Action issued Nov. 12, 2013 in corresponding Japanese Application No. JP 2010-059898, with English translation thereof.
Office Action dated Jul. 9, 2014 in corresponding Chinese Application No. 201080010932.4, with English translation thereof.
Supplementary European Search Report issued Oct. 7, 2014 in corresponding European Application No. 10753556.9.

* cited by examiner

CATALYST FOR PRODUCTION OF HYDROGEN AND PROCESS FOR PRODUCING HYDROGEN USING THE CATALYST, AND CATALYST FOR COMBUSTION OF AMMONIA, PROCESS FOR PRODUCING THE CATALYST AND PROCESS FOR COMBUSTING AMMONIA USING THE CATALYST

This application is a U.S. national stage of International Application No. PCT/JP2010/054560 filed Mar. 17, 2010.

TECHNICAL FIELD

The present invention relates to a catalyst used for producing hydrogen using ammonia as a raw material and a process for producing hydrogen using the catalyst. The present invention also relates to a catalyst used for combusting ammonia existing in air or high concentration ammonia contained in an industrial waste gas, etc. at low temperature, a process for producing the catalyst and a process for combusting ammonia using the catalyst.

BACKGROUND ART

With respect to techniques for production of hydrogen, there are by-product hydrogen from other industrial processes, e.g., from processes manufacturing iron and steel, hydrogen produced by reforming coal and petroleum, etc. Hydrogen produced by such processes is strongly equipment-dependent and lack of convenience in the aspect of simple utilization thereof at proper timing.

On the other hand, as a means for easily obtaining hydrogen, there is a method of utilizing a decomposition reaction of ammonia. The reaction formula is as follows: $NH_3 \rightarrow 0.5N_2 + 1.5H_2$. Since this reaction is an endothermic reaction with a large amount of 10.9 kcal/mol, it is required to supply the reaction heat from the outside of the reaction system. As a method for supplying the reaction heat, there is an autothermal reformer (ATR) involving combusting raw material ammonia or a portion of hydrogen produced by the decomposition reaction of ammonia and using the combustion heat as the reaction heat for ammonia decomposition (Patent Document 1, Non-Patent Document 1). The combustion reaction is as follows: $NH_3 + 0.75O_2 \rightarrow 0.5N_2 + 1.5H_2O$ and $H_2 + 0.5O_2 \rightarrow H_2O$. As a catalyst used for ATR, there are a catalyst obtained by supporting Ru on alumina (Patent Document 1) and a catalyst obtained by supporting Pt and Rh on alumina (Non-Patent Document 1).

However, in the case of using these catalysts, it is difficult to control the reaction in accordance with the catalyst composition and it is not easy sometimes to steadily obtain hydrogen in a constant concentration. Further, due to alteration of catalyst layer temperature, an ammonia reformer may possibly be damaged or the catalysts may possibly be deteriorated.

Due to these factors, the ammonia decomposition reaction becomes unstable. If the decomposition ratio is insufficient, a large quantity of ammonia remains in the gas after the reaction and it results in provision of a fuel with an inferior quality as a hydrogen fuel.

PRIOR ART DOCUMENTS

Patent Document

Patent Document 1: WO 01/87770

Non-Patent Document

Non-Patent Document 1: Takashiro MUROI, Industrial Noble Metal Catalysts, Saiwai Shobo, p. 297, May 26, 2003

SUMMARY OF THE INVENTION

Problems to be Solved by the Invention

The present invention aims to find a cheap and practical catalyst which can be used to combust a portion of ammonia and utilize the combustion heat for ammonia decomposition reaction to efficiently produce hydrogen from ammonia. Further, the present invention also aims to provide a technique for efficiently producing hydrogen from ammonia by using the catalyst. In addition, the present invention also provides a catalyst for combustion of ammonia excellent in practical applicability which has the same ammonia combustion activity as that of a noble metal-based catalyst without using any costly noble metal element, a process for producing the catalyst, and a process for combusting ammonia using the catalyst.

Means for Solving the Problems

The present inventors have made various investigations and consequently have found the following catalyst and the process for producing hydrogen from ammonia using the catalyst.

The catalyst for production of hydrogen of the present invention is a catalyst used for obtaining hydrogen from a gas containing ammonia and oxygen, and is characterized in that the catalyst comprises an ammonia-combusting catalytic component and an ammonia-decomposing catalytic component.

The ammonia-combusting catalytic component is preferable to contain a manganese oxide as A component. More preferably, the ammonia-combusting catalytic component contains a manganese-cerium oxide as A component and at least one kind of metal elements selected from a metal element belonging to Group 8 to Group 11 in the periodic table as B component, and the manganese-cerium oxide contains 1 to 60% by mass of manganese in terms of manganese dioxide. And even more preferably, the manganese-cerium oxide contained as A component is an evenly and densely mixed manganese-cerium oxide identified as an oxide having a fluorite type structure of cerium dioxide by x-ray diffraction measurement.

Further, the ammonia-combusting catalytic component may contain a manganese-lanthanum oxide as A component. In this case, the manganese-lanthanum oxide contained as A component is preferably identified as an oxide having a perovskite type structure by x-ray diffraction measurement. More preferably, the perovskite type manganese-lanthanum oxide contained as A component further contains at least one kind of metal elements selected from an alkali metal, an alkaline earth metal, a lanthanide-based rare earth metal and a metal element belonging to Group 8 to Group 11 in the periodic table as C component, in the crystal structure thereof.

In addition, the ammonia-combusting catalytic component may be a noble metal catalyst containing at least one kind of metal elements selected from the group consisting of platinum, palladium, rhodium, iridium and ruthenium.

The ammonia-combusting catalytic component is also preferable to further contain an alkali metal and/or an alkaline earth metal as D component.

On the other hand, the ammonia-decomposing catalytic component is preferable to contain at least one kind of elements selected from Group 6 to Group 10 in the periodic table and is more preferable to be a metal catalyst and/or a metal oxide catalyst containing at least one kind of elements selected from Group 6 to Group 10 in the periodic table.

The ammonia-decomposing catalytic component is preferable to further contain at least one kind of metal oxides selected from the group consisting of aluminum oxide, titanium oxide, zirconium oxide, cerium oxide, lanthanum oxide, zeolite, magnesium oxide, calcium oxide, barium oxide, yttrium oxide, tungsten oxide, silicon dioxide, silica-alumina and a titanium-based composite oxide as E' component. Further, it is also preferable to contain an alkali metal and/or an alkaline earth metal as D' component.

The process for producing hydrogen of the present invention is characterized in that the process uses the above-mentioned catalyst for production of hydrogen to produce hydrogen from a gas containing ammonia and oxygen.

In the production process, it is preferable to add 0.05 mol or more and less than 0.75 mol of oxygen to 1 mol of ammonia. Further, it is preferable that the ammonia-combusting catalytic component and the ammonia-decomposing catalytic component are arranged in the front stage and in the rear stage, respectively, to the flow of the gas containing ammonia and oxygen. It is furthermore preferable that the gas containing ammonia and oxygen is brought into contact with the ammonia-combusting catalytic component arranged in the front stage to the flow of the gas for combusting the ammonia in the presence of the oxygen and consuming substantially entire amount of the oxygen to generate combustion heat and that the gas heated by the combustion heat is brought into contact with the ammonia-decomposing catalytic component arranged in the rear stage to the flow of the gas for decomposing the ammonia to obtain hydrogen. It is preferable to use 5 to 100 parts by volume of the ammonia-combusting catalytic component to 100 parts by volume of the ammonia-decomposing catalytic component. In addition, it is preferable that the temperature of the reaction gas to be supplied to the ammonia-decomposing catalytic component is adjusted to 300° C. to 1100° C.

The other catalyst for production of hydrogen of the present invention is a catalyst used for obtaining hydrogen from a gas containing ammonia and oxygen, and is characterized in that the catalyst contains at least one kind of metal elements selected from the group consisting of cobalt, iron, nickel and molybdenum.

As D" component, an alkali metal, an alkaline earth metal or a rare earth element may further be added to the catalyst. Furthermore, the catalyst may further contain at least one kind of metal oxides selected from the group consisting of alumina, silica, zirconia, titania, ceria, lanthanum oxide, magnesium oxide, calcium oxide, barium oxide and strontium oxide as E" component.

The other process for producing hydrogen of the present invention is characterized in that the process uses the above-mentioned catalyst for production of hydrogen to produce hydrogen from a gas containing ammonia and oxygen. In the process, it is preferable to add 0.05 mol or more and less than 0.75 mol of oxygen to 1 mol of ammonia.

The catalyst for combustion of ammonia of the present invention is a catalyst for combustion of ammonia comprising a manganese-cerium oxide and at least one kind of metal elements selected from a non-noble metal element belonging to Group 8 to Group 11 in the periodic table, and is characterized in that the manganese-cerium oxide contains 1 to 60% by mass of manganese in terms of manganese dioxide.

The manganese-cerium oxide is preferably identified as an evenly and densely mixed manganese-cerium oxide having a fluorite type structure of cerium dioxide by x-ray diffraction measurement. The catalyst for combustion of ammonia is preferable to contain 30 to 99.95% by mass of the manganese-cerium oxide and 0.05 to 20% by mass of at least one kind of metal elements selected from the non-noble metal element belonging to Group 8 to Group 11 in the periodic table. Further, at least one kind of metal elements selected from the non-noble metal element belonging to Group 8 to Group 11 in the periodic table is preferably silver and/or copper. In addition, the catalyst for combustion of ammonia may further comprise at least one kind of refractory inorganic oxides selected from the group consisting of alumina, silica, silica-alumina, titania, zirconia, zeolite, magnesia, calcia, lanthanum oxide and a titanium-based composite oxide.

The process for producing the catalyst for combustion of ammonia of the present invention is characterized in that the process involves a step of obtaining a manganese-cerium oxide by mixing cerium oxide or a precursor of cerium oxide with a manganese compound solution and firing the mixture at 300° C. to 900° C. in air after drying the mixture. In the step of obtaining the manganese-cerium oxide, it is preferable to add an organic acid in an amount of 0.1 to 2 mol per 1 mol of the manganese compound to the manganese compound solution.

The process for combusting ammonia of the present invention is characterized in that a reaction gas containing at least ammonia and oxygen at a molar ratio of oxygen to ammonia of less than 0.75 is brought into contact with the catalyst for combustion of ammonia to carry out ammonia combustion reaction and accordingly to obtain an ammonia-containing gas substantially free from oxygen and heated by the combustion reaction from an outlet of the catalyst for combustion of ammonia. In the combustion process, it is preferable that the reaction gas is supplied in the condition of a space velocity of 10,000 to 1,000,000 $h^{-1}$ to the catalyst for combustion of ammonia to increase the temperature to 100° C. to 500° C.

Effects of the Invention

The present invention can provide a cheap and practical catalyst for a process for obtaining hydrogen by decomposition of ammonia, which can promote a self-directing reaction by combusting a portion of ammonia and utilizing the obtained combustion heat for decomposition of ammonia without using excess heat from the outside of a reactor and efficiently produce hydrogen from ammonia. Further, the present invention can also provide a technique of efficiently producing hydrogen from ammonia by using the catalyst. In addition, the present invention can provide a catalyst for combustion of ammonia excellent in practical applicability which has the same ammonia combustion activity as that of a noble metal-based catalyst without using any costly noble metal element, a process for producing the catalyst, and a process for combusting ammonia using this catalyst.

MODE FOR CARRYING OUT THE INVENTION

Catalyst for Production of Hydrogen 1

Figure 1:
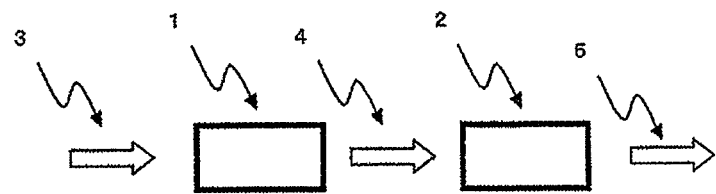
FIG. 1 is one of utilization aspects of the catalyst for production of hydrogen of the present invention, which is a schematic view showing an ammonia-combusting catalytic component arranged in the front stage and an ammonia-decomposing catalytic component arranged in the rear stage to the flow of a gas, as a separate catalyst.
Figure 2:
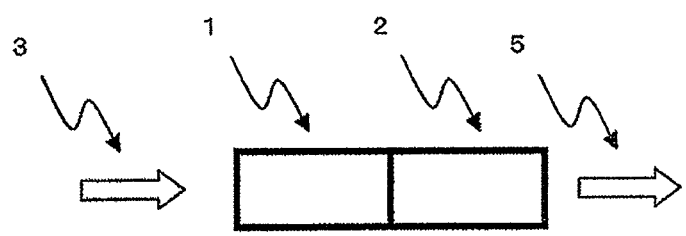
FIG. 2 is one of utilization aspects of the catalyst for production of hydrogen of the present invention, which is a schematic view showing an ammonia-combusting catalytic component arranged in the front stage and an ammonia-decomposing catalytic component arranged in the rear stage to the flow of a gas in one refractory three-dimensional structure body.
Figure 3:
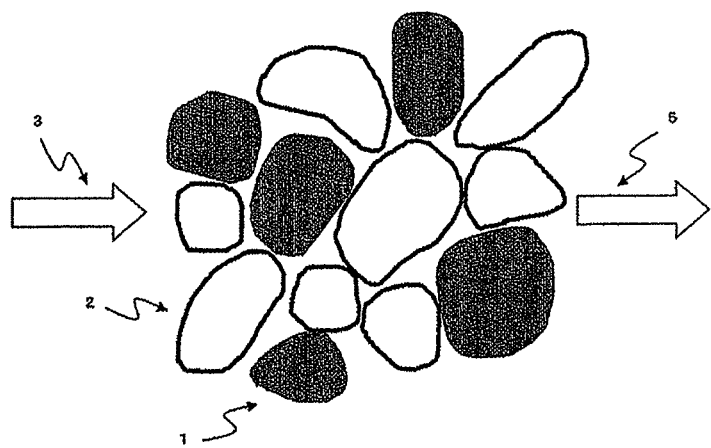
FIG. 3 is one of utilization aspects of the catalyst for production of hydrogen of the present invention, which is a schematic view showing an ammonia-combusting catalytic component and an ammonia-decomposing catalytic component in a mixed form. The black one shows the ammonia-combusting catalytic component and the white one shows the ammonia-decomposing catalytic component.
Figure 4:
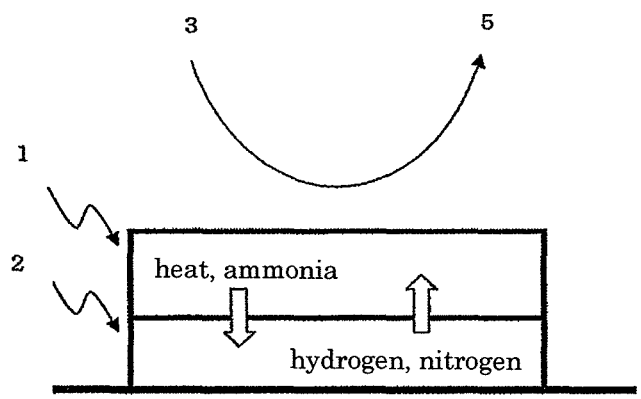
FIG. 4 is one of utilization aspects of the catalyst for production of hydrogen of the present invention, which is a schematic view showing an ammonia-combusting catalytic component arranged in an upper layer and an ammonia-decomposing catalytic component arranged in a lower layer of a single refractory three-dimensional structure body.

The catalyst for production of hydrogen of the present invention (catalyst for production of hydrogen 1) is a catalyst used for obtaining hydrogen from a gas containing ammonia and oxygen and is characterized in that the catalyst contains an ammonia-combusting catalytic component and an ammonia-decomposing catalytic component.

The ammonia-combusting catalytic component of the present invention has a catalytic function of promoting combustion reaction of ammonia under a temperature condition of 50° C. to 300° C. and consuming the substantially entire amount of supplied oxygen.

(Manganese-Based Ammonia-Combusting Catalytic Component)

The ammonia-combusting catalytic component in the catalyst of production of hydrogen of the present invention is preferable to contain a manganese oxide (manganese-based ammonia-combusting catalytic component) as A component.

The A component may be a manganese-cerium oxide (hereinafter, the ammonia-combusting catalytic component is abbreviated as "Mn—Ce-based combustion component"). In the Mn—Ce-based combustion component, it is preferable to contain 1 to 60% by mass of manganese in terms of manganese dioxide.

The Mn—Ce-based combustion component is preferably identified as an evenly and densely mixed manganese-cerium oxide having a fluorite type structure of cerium dioxide by powder x-ray diffraction measurement. The evenly and densely mixed manganese-cerium oxide, which is a preferable form of the A component of the present invention, has a crystal peak of fluorite type cerium dioxide as a main peak but has no diffraction peak derived from manganese oxide, in the case of measurement by powder x-ray diffraction. The crystal structure of the powder sample can be confirmed by measuring the lattice spacing (d value). The x-ray diffraction measurement may be carried out under the conditions of a CuKa ray source, a voltage of 45 KV, a current of 40 mA, a scanning range of 10 to 90°, and a scanning rate of 0.198°/minute. According to the result of the x-ray diffraction measurement, the evenly and densely mixed manganese-cerium oxide obtained by the present invention has a d value of the main peak in a range of 3.07 to 3.15, which almost completely corresponds with the d value, 3.12, of the fluorite type structure of cerium dioxide disclosed in the JCPDS (Joint Committee for Powder Diffraction Standards) card. The d value of cerium dioxide disclosed in the card is 3.12, 1.91, 1.63, 2.71, etc., in the order of high relative intensity. The crystal peaks other than the main peak of the evenly and densely mixed manganese-cerium oxide are also detected at almost completely the corresponding positions (d value±0.05) and thus it is supposed that the crystal structure of the evenly and densely mixed manganese-cerium oxide almost completely corresponds with the fluorite type structure of cerium dioxide.

The Mn—Ce-based combustion component is preferable to contain 1 to 60% by mass of manganese in terms of manganese dioxide. It is more preferably 2 to 50% by mass and even more preferably 5 to 40% by mass. Regardless of such a high content of manganese, no diffraction peak derived from manganese oxide is observed in the evenly and densely mixed manganese-cerium oxide, and thus it is presumed that manganese oxide is highly dispersed on cerium oxide in an amorphous state.

In the case where the content of manganese in terms of manganese dioxide in the Mn—Ce-based combustion component is less than 1% by mass, the ammonia combustion activity becomes insufficient so that the ammonia combustion reaction cannot be carried out efficiently. In the case where it exceeds 60% by mass, the manganese oxide tends to be coarsened and it may result in decrease of heat resistance or ammonia combustion activity and therefore, it is not preferable.

In general, there are forms of $MnO$, $MnO_2$, $Mn_2O_3$, $Mn_3O_4$, etc., as the crystal structure of manganese oxide and it has been known that particularly $MnO_2$ is referred to as active manganese dioxide and has high oxidizability. However, since $MnO_2$ tends to undergo phase change by heat, it has been difficult to use it as a catalyst for combustion of ammonia to be used under a high temperature condition. It has been found that, even after heat exposure at a temperature as high as 900° C., the Mn—Ce-based combustion component, particularly the evenly and densely mixed manganese-cerium oxide, which is produced by the production process described below, has nearly only a fluorite type crystal peak of cerium dioxide in the x-ray diffraction measurement, and thus the heat stability thereof has been remarkably improved.

Next, a process for producing the Mn—Ce-based combustion component will be described. The Mn—Ce-based combustion component can be produced by a solid-phase mixing method, a solid-liquid mixing method, a liquid-phase coprecipitation method, a sol-gel method using alkoxides, etc. As a preferable method for preparing the evenly and densely mixed manganese-cerium oxide which is a preferable form of the Mn—Ce-based combustion component, particularly the solid-liquid mixing method capable of producing an evenly and densely mixed oxide with high activity by using cheap raw materials and simple production apparatus can be taken as an example. The solid-liquid mixing method is a preparation method of using either manganese or cerium as a solid raw material insoluble in a solvent to be used, using the other metal salt in a form of a solution obtained by dissolving the other metal salt in a solvent such as water, and mixing both of them. It is preferable to use a cerium source as the solid raw material and a manganese source as the solution.

A concrete process for producing the Mn—Ce-based combustion component of the present invention is preferably a process involving sufficiently mixing cerium oxide or a precursor of cerium oxide with a manganese compound solution and firing the mixture at 300° C. to 900° C. in air after drying of the mixture. According to this production process, an evenly and densely mixed manganese-cerium oxide with a specific surface area of 20 to 100 m$^2$/g can be prepared. Examples usable as the cerium source may be cerium oxide with low crystallinity and a precursor of cerium oxide such as cerium carbonate, cerium hydroxide, etc., and particularly, it is preferable to use cerium carbonate as the cerium source which can provide an evenly and densely mixed manganese-cerium oxide with porosity and a high specific surface area. Examples usable as the manganese source may be a solution of a manganese compound, e.g., manganese nitrate, manganese chloride, manganese acetate, etc., soluble in a solvent such as water, and it is particularly preferable to use an aqueous manganese nitrate solution. The amount of the solvent such as water added is within a range in which solid and liquid are mixed evenly and can be properly changed in accordance with modes of a mixing device or a drying device. Drying may be carried out for removing the solvent such as water in a range of 80° C. to 200° C. for 1 to 24 hours and thereafter, the mixture can be fired at 300° C. to 900° C., preferably 500° C. to 700° C. in air to prepare the evenly and densely mixed manganese-cerium oxide.

Further, in the production process of the Mn—Ce-based combustion component, an evenly and densely mixed manganese-cerium oxide with higher activity and a fine structure can be obtained by adding an organic acid such as acetic acid, citric acid, maleic acid, malic acid, succinic acid, etc., to the manganese compound solution. The amount of the organic acid added is preferably 0.1 to 2 mol, more preferably 0.3 to 1.5 mol and even more preferably 0.5 to 1 mol per 1 mol of the manganese compound. In the case where the amount of the organic acid added is less than 0.1 mol, no addition effect can be obtained. And in the case where it exceeds 2 mol, it is possible to cause an adverse effect on the properties of the evenly and densely mixed manganese-cerium oxide since reducing atmosphere is formed at the time of firing and therefore, it is not preferable.

The Mn—Ce-based combustion component used in the present invention may contain at least one kind of metal elements selected from a metal element belonging to Group 8 to Group 11 in the periodic table as B component. Iron, ruthenium and osmium in Group 8; cobalt, rhodium and iridium in Group 9; nickel, palladium and platinum in Group 10; and copper, silver, and gold in Group 11 are usable. The preferable B component in terms of the cost is at least one kind of metal elements selected from iron, cobalt, nickel, copper and silver. In addition, the B component is preferably contained in a form of a metal or a metal oxide of each element.

Inclusion of silver and/or copper as B component can improve the ammonia combustion activity and give a high ammonia combustion activity at low temperature. Further, inclusion of at least one kind of metal elements selected from iron, nickel and cobalt can provide the ammonia-combusting catalytic component with ammonia decomposition capability. Use of the ammonia-combusting catalytic component having ammonia decomposition activity makes it possible to utilize the heat generated by the ammonia combustion reaction for the heat absorbed by the ammonia decomposition reaction and at the same time to suppress excess temperature increase of the ammonia-combusting catalytic component, and thus functional deterioration of the ammonia-combusting catalytic component by heat can be prevented. Consequently, it is preferable to contain silver and/or copper as well as at least one kind of metal elements selected from iron, nickel and cobalt as B component.

The Mn—Ce-based combustion component of the present invention is preferable to contain 10 to 99.95% by mass of the manganese-cerium oxide as A component and 0.05 to 80% by mass of the metal element of Group 8 to Group 11 in the periodic table in terms of the oxide of the metal element as B component. In the case where the content of the manganese-cerium oxide as A component is less than 10% by mass, the oxidation rate of ammonia becomes slow and it becomes difficult to obtain high ammonia combustion activity. It is preferably 15% by mass or higher and more preferably 20% by mass or higher. In the case where the content of the metal element of Group 8 to Group 11 in the periodic table as B component is less than 0.05% by mass, the ammonia oxidation capability at low temperature becomes insufficient, and even if it exceeds 80% by mass, an effect for functional improvement is scarcely caused, the dispersibility is deteriorated and particles may possibly be grown and therefore, it is not preferable.

A method for adding B component in the process for producing the Mn—Ce-based combustion component of the present invention is not particularly limited and examples thereof include the following methods (1) to (3). (1) a method of spraying an aqueous solution of a nitrate, a sulfate, etc., of the metal element of B component to a powder of the Mn—Ce-based combustion component or immersing the powder in the aqueous solution, drying and firing the mixture for support to form a catalyst composition, and drying and firing the composition; (2) a method of kneading a powder of the Mn—Ce-based combustion component and a solution of a metal salt of B component to form the mixture, and drying and firing the formed mixture; and (3) a method of forming a catalyst composition containing the Mn—Ce-based combustion component, drying and firing the catalyst composition, thereafter immersing the catalyst composition in a solution of a metal salt of the catalyst B component, and drying and firing the mixture. Firing of the catalyst component is at a temperature of 300° C. to 900° C. and preferably 400° C. to 600° C. in air.

As other aspects, the ammonia-combusting catalytic component of the present invention may contain a manganese-lanthanum oxide as A component (hereinafter, this ammonia-combusting catalytic component is abbreviated as "Mn—La-based combustion component"). This Mn—La-based combustion component is preferably identified as an oxide having a perovskite type structure by the powder x-ray diffraction measurement.

The perovskite type Mn—La-based combustion component is preferable to further contain, at least one kind of metal elements selected from an alkali metal such as lithium, an alkaline earth metal such as calcium and strontium, a lanthanide-based rare earth metal such as cerium and preseodymium, and a metal element belonging to Group 8 to Group 11 in the periodic table as C component, in the crystal structure thereof. Although the content of manganese contained in the perovskite type Mn—La-based combustion component is changed in accordance with a relationship with the amount of C component incorporated in the perovskite type crystal structure, it is generally preferably 10 to 50% by mass in terms of manganese dioxide.

Inclusion of silver and/or copper as C component can improve the ammonia combustion activity. Further, inclusion of at least one kind of metal elements selected from iron, nickel and cobalt can provide the ammonia-combusting catalytic component with ammonia decomposition capability.

Consequently, it is preferable to contain silver and/or copper as well as at least one kind of metal elements selected from iron, nickel and cobalt as C component.

The perovskite type manganese-lanthanum oxide, which is a preferable form of the manganese-lanthanum oxide, may be produced by a solid-phase mixing method, a solid-liquid mixing method, a liquid-phase coprecipitation method, a sol-gel method using alkoxides, etc. Particularly, the liquid-phase coprecipitation method, which can produce a highly active perovskite type oxide having a small particle size and few impurity crystal phases other than the perovskite structure using cheap raw materials and a simple production device, is a preferable production method. The liquid-phase coprecipitation method may involve, for example, producing a precipitate by adding dropwise an aqueous solution containing prescribed amounts of a manganese compound and a lanthanum compound to an aqueous solution containing an excess amount of a basic substance such as ammonia, tetramethylammonium hydroxide (TMAH), etc., under stirring condition; filtering the precipitate and washing it with water; thereafter drying the precipitate; and crystallizing the precipitate by heat treatment at 500° C. to 900° C.

Further, with respect to the addition method of C component, for example, in the case of preparing a Mn—La-based combustion component containing C component in the crystal structure by the liquid-phase coprecipitation method, C component may be incorporated in the perovskite structure by preparing a mixed aqueous solution which is obtained by adding a prescribed amount of a water-soluble salt of C component to an aqueous solution containing prescribed amounts of a manganese compound and a lanthanum compound; producing a precipitate by adding dropwise the mixed aqueous solution to an aqueous solution containing an excess amount of a basic substance such as ammonia, TMAH, etc., under stirring condition; filtering the precipitate and washing it with water; thereafter drying the precipitate; and crystallizing the precipitate by heat treatment at 500° C. to 900° C.

In addition to A component and B component (or C component), the ammonia-combusting catalytic component of the present invention (including both of the Mn—Ce-based combustion component and the Mn—La-based combustion component, the same applies hereinafter) may further contain at least one kind of refractory inorganic oxides (E component) selected from the group consisting of alumina, silica, silica-alumina, titania, zirconia, zeolite, magnesia, calcia, lanthanum oxide and a titanium-based composite oxide. In the case where the refractory inorganic oxide is contained, 0 to 50% by mass of the oxide may be contained. Addition of the refractory inorganic oxide improves the activity due to improvement of the dispersibility of A component and B component (or C component) and improves the mechanical strength of the catalyst. In the case where the amount of the refractory inorganic oxide exceeds 50% by mass, the content of A component and B component (or C component) becomes low and accordingly, sufficient catalytic activity cannot be obtained and therefore, it is not preferable.

The ammonia-combusting catalytic component may further contain an alkali metal and/or an alkaline earth metal as D component. Addition of D component further improves the ammonia decomposition capability which is provided with the ammonia-combusting catalytic component. The content of D component is 0.1 to 10% by mass and more preferably 0.3 to 7% by mass to the ammonia-combusting catalytic component. If the content of D component is less than 0.1% by mass, no effect of improving the ammonia decomposition capability can be caused. If D component is added in an amount beyond 10% by mass, the ammonia combustion activity is lowered and therefore, it is not preferable.

A prescribed amount of D component may be added in the step of preparing the ammonia-combusting catalytic component or may be added to the ammonia-combusting catalytic component after preparation.

(Noble Metal-Based Ammonia-Combusting Catalytic Component)

As the ammonia-combusting catalytic component in the catalyst for production of hydrogen of the present invention, a noble metal catalyst containing at least one kind of elements selected from the group consisting of platinum, palladium, rhodium, iridium and ruthenium (noble metal-based ammonia-combusting catalytic component) can be used.

The noble metal-based catalyst may be obtained by supporting the noble metal on a carrier, and a usable carrier may be a metal oxide such as α-alumina, γ-alumina, silica, titania, zirconia, magnesia, etc.

An alkali metal such as sodium, potassium, rubidium, cesium, etc; an alkaline earth metal such as magnesium, calcium, barium, etc; and a rare earth metal such as lanthanum, cerium, preseodymium, neodymium, etc., may also be added to the noble metal-based catalyst. Addition of these metal elements improves the heat resistance of the metal oxide as the carrier, suppresses aggregation of the noble metal components, improves the ammonia combustion activity, etc., and thus makes the capability of the ammonia-combusting catalytic component more excellent.

As a method for preparing the noble metal-based catalyst, a general method in the case of preparing a noble metal-based catalyst is usable. For example, (1) a method of mixing a carrier and a fine powder of a noble metal; (2) a method of immersing a carrier in a solution of a noble metal; (3) a method of immersing respective carriers in respective components when a plurality of noble metal components are mixed and thereafter obtaining powders by drying and firing, and mixing the powders; and (4) a method of using a honeycomb-like structure body as a catalyst-supporting substrate, obtaining a slurry by wet-pulverizing a noble metal-supporting carrier, coating the structure body with the slurry, and drying and firing the structure body, etc., are usable.

(Ammonia-Decomposing Catalytic Component)

The ammonia-decomposing catalytic component has a catalytic capability of promoting ammonia decomposition reaction in a temperature condition of 300° C. to 900° C. to produce hydrogen and nitrogen from ammonia.

The ammonia-decomposing catalytic component of the present invention is preferable to contain at least one kind of elements selected from a transition metal element belonging to Group 6 to Group 10 in the periodic table. Especially, the ammonia-decomposing catalytic component is more preferable to contain molybdenum, iron, cobalt and nickel. These elements may be metals or oxides and may be those which generally stably exist.

At least one kind of elements selected from the transition metal element belonging to Group 6 to Group 10 in the periodic table is an indispensable component of the ammonia-decomposing catalytic component, and the content thereof is preferably 5 to 90% by mass and more preferably 10 to 80% by mass to 100% by mass of the ammonia-decomposing catalytic component.

The element can be used solely as it is and may be used while being supported on a carrier. The carrier may be at least one kind of metal oxides (E' component) selected from the group consisting of aluminum oxide (e.g., α-alumina, γ-alumina, etc.), titanium oxide, zirconium oxide, cerium oxide, lanthanum oxide, zeolite, magnesium oxide, calcium oxide, barium oxide, yttrium oxide, tungsten oxide, silicon dioxide, silica-alumina and a titanium-based composite oxide.

The content of E' component is preferably 10 to 95% by mass and more preferably 20 to 90% by mass to 100% by mass of the ammonia-decomposing catalytic component.

An alkali metal such as sodium, potassium, rubidium, cesium, etc; an alkaline earth metal such as magnesium, calcium, barium, etc; and a rare earth metal such as lanthanum, cerium, preseodymium, neodymium, etc (D' component) may also be added to the ammonia-decomposing catalytic component. Various kinds of addition methods of D' component, such as a method of adding D' component which is in a complex state with a metal oxide of E' component; a method of adding D' component after supporting a catalyst on a metal oxide of E' component; etc, can be employed. The complex state not only means simple mixing of the respective components but also formation of a solid-solution, a composite oxide, etc.

The content of D' component is 0 to 25% by mass, preferably 0.2 to 15% by mass, and more preferably 0.4 to 10% by mass, to 100% by mass of the ammonia-decomposing catalytic component.

As a method for preparing the ammonia-decomposing catalytic component, a general method employed at the time of preparing a metal oxide-based or metal-based catalyst can be used, and examples thereof may include: (1) a method of forming metal oxides of respective components into prescribed shape to obtain the decomposition catalytic component and if necessary, reducing the decomposition catalytic component with a reducing gas; (2) a method of immersing a metal oxide to be a carrier (E' component) in a solution containing at least one kind of elements selected from a transition metal element belonging to Group 6 to Group 10 in the periodic table to support the element, thereafter drying and firing it, and if necessary, reducing it with a reducing gas; (3) a method of immersing a separate metal oxide to be a carrier (E' component) in respective catalytic components in the case of mixing a plurality of catalytic components, thereafter drying and firing it to obtain powders, mixing the powders, and if necessary, reducing the mixture with a reducing gas; (4) a method of mixing respective metal oxides, forming the mixture in a prescribed shape and thereafter, if necessary, reducing the mixture with a reducing gas to obtain the decomposition catalytic component; (5) a method of immersing a metal or a metal oxide in an aqueous solution of an additive component which is another component, drying and firing it, forming it into a prescribed shape and thereafter, if necessary, reducing it with a reducing gas; and (6) a method of preparing an aqueous metal salt solution containing a prescribed amount of a water-soluble metal salt of element constituting a metal oxide such as a composite oxide or a solid-solution oxide, adding the aqueous solution to a strongly basic aqueous solution obtained by dissolving a basic substance such as ammonia, ammonium carbonate, potassium hydroxide, TMAH, etc. to precipitate a metal hydroxide, filtering the metal hydroxide, washing it with water, recovering and drying it, and thereafter subjecting it to heat treatment to prepare an aimed composite oxide, solid-solution oxide; etc.

The ammonia-combusting catalytic component or the ammonia-decomposing catalytic component may be used while being formed into a certain form. Examples of the form of the formed body may include ring-like, horseshoe-like, and honeycomb-like forms. Further, the ammonia-combusting catalytic component or the ammonia-decomposing catalytic component may be used while being coated on an inactive structure body of honeycomb-like or corrugated monolith, spherical or saddle-like shape.

Catalyst for Production of Hydrogen 2

The other catalyst for production of hydrogen of the present invention (catalyst for production of hydrogen 2) contains at least one kind of elements selected from the group consisting of cobalt, iron, nickel and molybdenum, and preferably contains at least one kind of elements selected from the group consisting of cobalt, nickel and molybdenum.

The element may be used as a single oxide and also as a composite oxide and a solid-solution oxide. For example, a composite oxide such as cobalt-lanthanum, nickel-lanthanum and cobalt-molybdenum can be used. The composite oxide may be those which have particular crystal peak and those which show amorphous state, in the analysis of x-ray diffraction. Further, the element may be used after being made into a state suitable for reaction such as metal, nitride or carbide.

Further, the catalyst may contain an alkali metal, an alkaline earth metal or a rare earth element as D" component. The amount added is preferably 0.1 to 20 parts by mass and more preferably 0.5 to 10 parts by mass to 100 parts by mass of the catalyst.

Furthermore, the catalyst may contain at least one kind of metal oxides selected from the group consisting of alumina, silica, zirconia, titania, ceria, lanthanum oxide, magnesium oxide, calcium oxide, barium oxide and strontium oxide as E" component. In the case where the catalytic component is, for example, an oxide-based catalytic component such as a composite oxide or a solid-solution oxide, the metal oxide component may be contained in an amount of 5 to 90 parts by mass, preferably 10 to 80 parts by mass to 100 parts by mass of the oxide-based catalytic component. Further, the metal oxide component may be contained in an amount of 3 to 60 parts by mass and preferably 5 to 30 parts by mass to a non-oxide-based, metal-based catalytic component. These metal oxide components may have a function as a carrier.

As a method for preparing the catalyst, a general method employed at the time of preparing a catalyst can be used. For example, in the case of an oxide-based catalytic component, examples thereof may include: (1) a method of forming metal oxides of respective catalytic components into prescribed shape to obtain a catalyst; (2) a method of immersing an oxide component to be a carrier in a solution containing an element of a precursor of an oxide-based catalytic component, thereafter drying and firing it, and thereby supporting the oxide-based catalytic component on the oxide component to be the carrier to obtain a catalyst; (3) a method of immersing an oxide component to be a separate carrier in respective components in the case of mixing a plurality of oxide-based catalytic components, thereafter drying and firing it to obtain powders, and mixing the powders; (4) a method of mixing respective oxide-based catalytic components and forming the mixture into a prescribed shape to obtain a catalyst; (5) a method of preparing an aqueous metal salt solution containing a prescribed amount of a water-soluble metal salt of elements constituting a metal oxide such as a composite oxide or a solid-solution oxide, adding the aqueous solution to a strongly basic aqueous solution obtained by dissolving a basic substance such as ammonia, ammonium carbonate, potassium hydroxide, TMAH, etc. to precipitate a metal hydroxide, filtering the metal hydroxide, washing it with water, recovering and drying it, and thereafter subjecting it to heat treatment to prepare an aimed composite oxide or solid-solution oxide; and (6) a method of mixing prescribed amounts of a metal oxide, a metal carbonate, etc., in powder state by a mortar, and subjecting the mixed powder to heat treatment to obtain an aimed composite oxide or solid-solution oxide; etc.

Further, a general method may also be used for a non-oxide-based, metal-based catalytic component. Examples thereof may include: (1) a method of immersing an oxide component to be a carrier in an aqueous solution containing elements of the metal-based catalytic component, drying and firing it, and thereafter carrying out reduction treatment to obtain a catalyst; (2) a method of preparing an aqueous metal salt solution containing a prescribed amount of a water-soluble metal salt of catalyst-constituting elements, adding the aqueous solution to a strongly basic aqueous solution obtained by dissolving a basic substance such as ammonia, ammonium carbonate, potassium hydroxide, TMAH, etc. to precipitate a metal hydroxide, filtering the metal hydroxide, washing it with water, recovering and drying it, and thereafter, carrying out reduction treatment.

Further, the catalyst may be used while being formed into a certain form. Examples of the form of the formed body may be ring-like, horseshoe-like, honeycomb, spherical, column-like forms. Further, the catalyst may be used while being coated on an inactive structure body of honeycomb-like or corrugated monolith, spherical or saddle-like shape.

<Process for Producing Hydrogen>

An ammonia decomposition reaction is an endothermic reaction and in order to efficiently promote the reaction, it is required to supply heat from the outside. However, if simply a reactor is heated from the outside, excess heating tends to be caused partially, particularly in the outer circumferential part of the reactor and as a result, the ammonia decomposition reaction sometimes becomes uneven and thus it becomes difficult to steadily obtain hydrogen in a constant concentration in some cases. Further, there is a problem of decrease of ammonia decomposition ratio due to advancement of heat deterioration of the partially overheated catalyst.

To deal with the above-mentioned problem, the process for producing hydrogen of the present invention (including use of the catalyst for production of hydrogen 1 or 2, the same applies hereinafter) uses ATR for producing hydrogen by decomposing ammonia in which the heat necessary for the ammonia decomposition reaction is supplied by the combustion heat generated in the ammonia combustion reaction.

For details, at the time of production of hydrogen using the catalyst for production of hydrogen 1, a prescribed amount of oxygen is added to ammonia to obtain a reaction gas, the reaction gas is brought into contact with the ammonia-combusting catalytic component for substantially entirely consuming the oxygen by the combustion reaction to obtain combustion heat, the reaction gas in oxygen-free state and heated by the combustion heat is brought into contact with the ammonia-decomposing catalytic component for decomposing the ammonium in the gas to produce hydrogen. Also, at the time of production of hydrogen using the catalyst for production of hydrogen 2, a prescribed amount of oxygen is added to ammonia to obtain a reaction gas, the reaction gas is brought into contact with the catalyst for production of hydrogen 2 having both of ammonia combustion activity and decomposition activity to obtain heat necessary for the ammonia decomposition reaction by causing the ammonia combustion reaction prior to the ammonia decomposition reaction, and the heat is supplied to the same catalyst for producing hydrogen by decomposing ammonia. As described above, a portion of ammonia is oxidized to efficiently supply heat necessary for the decomposition reaction in the reactor, so that the problem attributed to partial excess heating easily caused at the time of heat supply from the outside of the reactor can be suppressed and decomposition of ammonia into hydrogen and nitrogen can be efficiently carried out.

The gas used in the process for producing hydrogen of the present invention may be a gas containing ammonia and oxygen. The molar ratio of oxygen to ammonia is preferably 0.05 or more and less than 0.75, more preferably 0.1 or more and 0.5 or less, and even more preferably 0.12 or more and 0.3 or less. At the time of adding oxygen to ammonia, since the combustion heat is increased as the amount of oxygen added is increased, the rate of the decomposition reaction is increased; however, since excess oxygen addition results in excessively higher temperature of the catalyst layer than the temperature necessary for the decomposition reaction and consequently the heat deterioration of the catalyst, the function and life of the catalyst is deteriorated, and therefore it is not preferable. In addition, excess oxygen addition may result in decrease of the hydrogen yield from ammonia and therefore, it is not preferable from the viewpoint of efficient hydrogen production. Moreover, a gas inert on the reaction such as nitrogen may be added to the gas containing ammonia and oxygen.

The space velocity (SV) of the reaction gas is preferably 100 to 700,000 $h^{-1}$ and more preferably 1,000 to 100,000 $h^{-1}$. In the case of lower than 100 $h^{-1}$, the reactor is so large as to be probably insufficient. In the case of beyond 700,000 $h^{-1}$, the reaction ratio may be possibly lowered to result in decrease of hydrogen yield.

(Preferable Aspect of Using Catalyst for Production of Hydrogen 1)

In the reaction of producing hydrogen using the catalyst for production of hydrogen 1, the arrangement of the ammonia-combusting catalytic component and the ammonia-decomposing catalytic component may be optional, if the heat necessary for the ammonia decomposition reaction can be supplied by the combustion heat generated by the ammonia combustion reaction to produce hydrogen, and examples thereof may include arrangement such that the ammonia-combusting catalytic component is arranged in the inlet side and the ammonia-decomposing catalytic component is arranged in the outlet side to the flow of the reaction gas and also arrangement for supplying the reaction gas to a mixed catalyst layer containing both components, that is, the ammonia-combusting catalytic component and the ammonia-decomposing catalytic component (e.g., 1 and 2 of FIGS. 1 to 4). A preferable embodiment is an embodiment that the ammonia-combusting catalytic component is arranged in the inlet side and the ammonia-decomposing catalytic component is arranged in the outlet side to the flow of the reaction gas (1 and 2 of FIGS. 1 and 2). In addition, hereinafter, the catalyst inlet side is sometimes referred to as a front stage and the catalyst outlet side is sometimes referred to as a rear stage.

Also, a more preferable embodiment is that a reaction gas obtained by adding a prescribed amount of oxygen to ammonia is supplied to the catalyst inlet side (the front stage) and brought into contact with the ammonia-combusting catalytic component for substantially completely consuming oxygen by the combustion reaction to generate combustion heat and to increase the gas temperature and successively, the remaining ammonia is brought into contact with the ammonia-decomposing catalytic component in a oxygen-free state in the catalyst outlet side (the rear stage) to decompose ammonia into hydrogen and nitrogen.

In the above-mentioned production process, the ammonia-combusting catalytic component is preferably in an amount of 5 to 100 parts by volume and more preferably 10 to 50 parts by volume, to 100 parts by volume of the ammonia-decomposing catalytic component.

The temperature of the reaction gas to be supplied to the catalyst layer inlet side is preferably 100° C. to 700° C. and more preferably 120° C. to 500° C. The pressure of the reaction gas is not particularly limited; however since the ammonia decomposition reaction is a reaction of increasing the number of molecules, in terms of equilibrium, the pressure is preferably reduced pressure to a slightly pressurized pressure to carry out the reaction.

In the case of carrying out hydrogen production due to ammonia decomposition by arranging the ammonia-combusting catalytic component in the inlet side and the ammonia-decomposing catalytic component in the outlet side to the flow of the reaction gas, the temperature of the reaction gas supplied to the catalyst outlet side (rear stage) is preferably 300° C. to 1100° C. and more preferably 400° C. to 950° C. The pressure of the reaction gas is not particularly limited; however since the ammonia decomposition reaction in the rear stage is a reaction of increasing the number of molecules, in terms of equilibrium, the pressure is preferably reduced pressure to a slightly pressurized pressure to carry out the reaction.

(Preferable Aspect of Using Catalyst for Production of Hydrogen 2)

The temperature of the hydrogen production reaction is preferably 150° C. to 1,000° C. and more preferably 200° C. to 800° C.

<Catalyst for Combustion of Ammonia>

The catalyst for combustion of ammonia of the present invention is a catalyst for combustion of ammonia containing a manganese-cerium oxide and at least one kind of metal elements selected from a non-noble metal element belonging to Group 8 to Group 11 in the periodic table, and is characterized in that the manganese-cerium oxide contains 1 to 60% by mass of manganese in terms of manganese dioxide. Herein, the manganese-cerium oxide is preferably identified as an evenly and densely mixed manganese-cerium oxide having a fluorite type structure of cerium dioxide by the powder x-ray diffraction measurement.

The content, identification method, preferable composition and preferable production process of the above-mentioned manganese-cerium oxide are same as those of the Mn—Ce-based combustion component.

The manganese-cerium oxide, particularly the evenly and densely mixed manganese-cerium oxide, is provided with a remarkably improved effect in terms of the heat stability. Further, it has been known that manganese oxide has high reactivity, and tends to be converted into manganese sulfide and manganese sulfate to deteriorate the capability thereof if a sulfur compound exists in the ammonia-containing gas which is a gas to be treated. However, in the manganese-cerium oxide, particularly the evenly and densely mixed manganese-cerium oxide, of the present invention, manganese oxide is stabilized and thus an effect of improving on the resistance to sulfur-poisoning is obtained.

As at least one kind of metal elements selected from the non-noble metal element belonging to Group 8 to Group 11 in the periodic table, iron in Group 8, cobalt in Group 9, nickel in Group 10, and copper and silver in Group 11 are usable. It is preferable to use silver and/or copper, and use of these elements can make combustion of ammonia possible in lower temperature range. The above-mentioned element is preferable to be contained in a form of metal or metal oxide. Additionally, a noble metal element belonging to Group 8 to Group 11 in the periodic table is referred to platinum, palladium, iridium, osmium, ruthenium, rhodium and gold.

A method for adding at least one kind of metal elements selected from the non-noble metal element belonging to Group 8 to Group 11 in the periodic table is not particularly limited, and the method similar to the addition method of B component described in the Mn—Ce-based combustion component can be employed.

The catalyst for combustion of ammonia of the present invention is preferable to contain 30 to 99.95% by mass of the manganese-cerium oxide and 0.05 to 20% by mass of at least one kind of metal elements selected from the non-noble metal element belonging to Group 8 to Group 11 in the periodic table. In the case where the content of the manganese-cerium oxide is less than 30% by mass, the oxidation rate of ammonia becomes slow and it becomes difficult to obtain high treatment efficiency. It is more preferably 50% by mass or more and even more preferably 70% by mass or more. In the case where the content of the non-noble metal element belonging to Group 8 to Group 11 in the periodic table is less than 0.05% by mass, the ammonia oxidation capability at low temperature becomes insufficient. And even if it exceeds 20% by mass, an effect for functional improvement is scarcely caused, the dispersibility is deteriorated and particles may possibly grow and therefore, it is not preferable.

To the catalyst for combustion of ammonia of the present invention, at least one kind of refractory inorganic oxides selected from the group consisting of alumina, silica, silica-alumina, titania, zirconia, zeolite, magnesia, calcia, lanthanum oxide and a titanium-based composite oxide may be added.

The refractory inorganic oxide is preferable to be contained in an amount of 0 to 69.95% by mass. Addition of the refractory inorganic oxide improves the activity due to improvement of the dispersibility of the manganese-cesium oxide and at least one kind of metal elements selected from the non-noble metal element belonging to Group 8 to Group 11 in the periodic table, as well as the mechanical strength of the catalyst. In the case where the amount of the refractory inorganic oxide exceeds 69.95% by mass, the content of the manganese-cesium oxide and at least one kind of metal elements selected from the non-noble metal element belonging to Group 8 to Group 11 in the periodic table is lowered and sufficient catalytic activity cannot be obtained and therefore, it is not preferable.

As a method for adding the refractory inorganic oxide, the method similar to the addition method of at least one kind of metal elements selected from the non-noble metal element belonging to Group 8 to Group 11 in the periodic table can be employed.

The catalyst for combustion of ammonia may be formed into pellet-like or honeycomb-like form. If necessary, as a forming aid, an organic binder such as starch, an inorganic binder such as silica sol or alumina sol, and ceramic fibers such as glass fibers can be added. The forming aid is preferably added in an amount of 15% by mass or less and more preferably 10% by mass or less in the catalyst composition. Further, the above-mentioned catalyst can also be used while being coated on the surface of a structure body which is formed into a honeycomb-like monolith, or a ring-like, spherical or horseshoe-like form.

The present invention can provide a catalyst for combustion of ammonia excellent in practical applicability which has the same ammonia combustion activity as that of a noble metal-based catalyst without using any costly noble metal element.

<Combustion Method>

The combustion method of the present invention is characterized in that a reaction gas containing ammonia and oxygen is brought into contact with the above-mentioned catalyst for combustion of ammonia to carry out ammonia combustion reaction and accordingly to obtain an ammonia-containing gas substantially free from oxygen and heated by the combustion reaction from an outlet of the catalyst for combustion of ammonia.

The reaction gas containing ammonia and oxygen may be any gas if it contains both components. In the case where the gas is composed of only ammonia and oxygen, the oxygen amount is 0.05 to 1 mol and preferably 0.1 mol or more and less than 0.75 mol to 1 mol of ammonia. Further, the reaction gas may be the one containing a gas inert on the reaction of the present invention such as nitrogen, a rare gas, carbon dioxide, etc. (inert gas). The amount of the inert gas is preferably 0.1 to 10 mol and more preferably 0.5 to 5 mol to 1 mol of ammonia.

Further, the reaction gas temperature is preferably 100° C. to 500° C. and more preferably 150° C. to 400° C. The reaction gas temperature herein is the temperature at which the combustion reaction of the reaction gas supplied to the catalyst for combustion of ammonia occurs.

The space velocity of the reaction gas to be supplied to the catalyst for combustion of ammonia is preferably 10,000 to 1,000,000 h$^{-1}$ and more preferably 15,000 to 750,000 h$^{-1}$.

EXAMPLES

Hereinafter, the present invention will be described concretely with reference to Examples. However, it should not be considered that the invention is only limited thereto.

Production Example of Catalyst for Production of Hydrogen 1 and Hydrogen Production Example Using Catalyst for Production of Hydrogen 1

Production Example of Manganese-Based Ammonia-Combusting Catalytic Component

Experimental Example 1

An evenly and densely mixed manganese-cerium oxide, which is A component, was prepared by the following method, according to a solid-liquid mixing method. Powder-formed cerium carbonate and an aqueous solution of manganese nitrate were weighed and sufficiently mixed in such a manner that the content of manganese oxide in the evenly and densely mixed manganese-cerium oxide became 50% by mass in terms of $MnO_2$, and the obtained mixture was dried at 150° C. overnight, fired at 500° C. for 5 hours and milled by a hammer mill to obtain the evenly and densely mixed manganese-cerium oxide powder. When the obtained evenly and densely mixed manganese-cerium oxide was subjected to the x-ray diffraction measurement in the condition of using a CuKa ray source, a voltage of 45 KV, a current of 40 mA, a scanning range of 10 to 90° and a scanning rate of 0.198°/minute, a main peak at the position showing the fluorite type crystal structure of cerium dioxide was detected and no crystal peak derived from manganese was observed. The specific surface area measured by BET method was 55 m$^2$/g.

An aqueous solution of silver nitrate was added to the obtained powder and sufficiently mixed in such a manner that the content of silver oxide in the silver-evenly and densely mixed manganese-cerium oxide to be obtained became 10% by mass in terms of $Ag_2O$, and the mixture was dried at 150° C. overnight and fired at 500° C. for 5 hours to obtain a Mn—Ce-based ammonia-combusting catalytic component 1.

Experimental Example 2

An aqueous solution of manganese-silver-lanthanum was prepared by adding 28.7 g of manganese nitrate hexahydrate, 4.25 g of silver nitrate and 54.1 g of lanthanum nitrate hexahydrate to 1000 mL of pure water. Next, while an aqueous TMAH solution, which was obtained by adding pure water to 1050 g of an aqueous TMAH solution of 25% by mass to dilute the solution to a liquid amount of about 3 L, being violently stirred, the aqueous solution of manganese-silver-lanthanum was slowly added dropwise thereto. On completion of the dropwise addition, the mixture was continuously stirred for about 30 minutes for aging. After the aging, the obtained precipitate was filtered, washed with pure water and thereafter dried at 110° C. The dried material was pulverized, and thereafter fired at 400° C. for 1 hour and further fired at 650° C. for 2 hours in atmospheric air to obtain a manganese-silver-lanthanum composite oxide (catalyst 2). When the catalyst 2 was subjected to the x-ray diffraction measurement in the same conditions as those of Experimental Example 1, it was found that the catalyst 2 was a composite oxide having a perovskite type structure. The specific surface area of the catalyst 2 measured by BET method was 31 m$^2$/g.

Experimental Example 3

A cerium carbonate powder in an amount of 19.6 g was added to an aqueous solution obtained by dissolving 6.6 g of manganese nitrate hexahydrate, 25.4 g of cobalt nitrate hexahydrate and 1.47 g of silver nitrate in distilled water. Next, the mixture was heated while being stirred by a hot stirrer for evaporating water therein to obtain a dried solid. The dried solid was dried at 150° C. overnight and thereafter, pulverized, and fired at 500° C. for 2 hours in atmospheric air to obtain a cobalt-silver-manganese-cerium oxide powder (catalyst 3). When the catalyst 3 was subjected to the x-ray diffraction measurement in the same conditions as those of Experimental Example 1, it was found that merely a peak showing the fluorite type crystal structure of cerium dioxide and a peak showing the structure of tricobalt tetroxide were detected, and no crystal peaks derived from silver and manganese were observed. Therefore, it was confirmed that manganese existed in the form of an evenly and densely mixed manganese-cerium oxide. In addition, the specific surface area of the catalyst 3 measured by BET method was 51 m$^2$/g.

Experimental Example 4

A cobalt-silver-manganese-cerium oxide powder (catalyst 4) was prepared in the same manner as in Experimental Example 3, except that the amount of cobalt nitrate hexahydrate used in Experimental Example 3 was changed to 14.5 g and the amount of cerium carbonate used in Experimental Example 3 was changed to 25.4 g. When the catalyst 4 was subjected to the x-ray diffraction measurement in the same conditions as those of Experimental Example 1, it was found that merely a peak showing the fluorite type crystal structure of cerium dioxide and a peak showing the structure of tricobalt tetroxide were detected, and no crystal peaks derived from silver and manganese were observed. Therefore, it was confirmed that manganese existed in the form of an evenly and densely mixed manganese-cerium oxide. In addition, the specific surface area of the catalyst 4 measured by BET method was 49 m$^2$/g.

Experimental Example 5

A cobalt-silver-manganese-cerium oxide powder (catalyst 5) was prepared in the same manner as in Experimental Example 3, except that the amount of cobalt nitrate hexahydrate used in Experimental Example 3 was changed to 36.26 g and the amount of cerium carbonate powder used in Experimental Example 3 was changed to 13.7 g. When the catalyst 5 was subjected to the x-ray diffraction measurement in the same conditions as those of Experimental Example 1, it was found that merely a peak showing the fluorite type crystal structure of cerium dioxide and a peak showing the structure of tricobalt tetroxide were detected, and no crystal peaks derived from silver and manganese were observed. Therefore, it was confirmed that manganese existed in the form of an evenly and densely mixed manganese-cerium oxide. In addition, the specific surface area of the catalyst 5 measured by BET method was 34 $m^2/g$.

Experimental Example 6

A cobalt-silver-manganese-cerium oxide powder (catalyst 6) was prepared in the same manner as in Experimental Example 3, except that the amount of cobalt nitrate hexahydrate used in Experimental Example 3 was changed to 47.14 g and the amount of cerium carbonate powder used in Experimental Example 3 was changed to 7.82 g. When the catalyst 6 was subjected to the x-ray diffraction measurement in the same conditions as those of Experimental Example 1, it was found that merely a peak showing the fluorite type crystal structure of cerium dioxide and a peak showing the structure of tricobalt tetroxide were detected, and no crystal peaks derived from silver and manganese were observed and it was confirmed that manganese existed in the form of an evenly and densely mixed manganese-cerium oxide. In addition, the specific surface area of the catalyst 6 measured by BET method was 28 $m^2/g$.

Experimental Example 7

A cerium carbonate powder in an amount of 5.1 g was added to an aqueous solution obtained by dissolving 5.3 g of manganese nitrate hexahydrate, 54.4 g of cobalt nitrate hexahydrate and 1.17 g of silver nitrate in distilled water. Next, the mixture was heated while being stirred by a hot stirrer for evaporating water therein to obtain a dried solid. The dried solid was dried at 150° C. overnight and thereafter, pulverized, and fired at 500° C. for 2 hours in atmospheric air to prepare a cobalt-silver-manganese-cerium oxide powder (catalyst 7). When the catalyst 7 was subjected to the x-ray diffraction measurement in the same conditions as those of Experimental Example 1, it was found that merely a peak showing the fluorite type crystal structure of cerium dioxide and a peak showing the structure of tricobalt tetroxide were detected, and no crystal peaks derived from silver and manganese were observed. Therefore, it was confirmed that manganese existed in the form of an evenly and densely mixed manganese-cerium oxide. In addition, the specific surface area of the catalyst 7 measured by BET method was 27 $m^2/g$.

Experimental Example 8

A cobalt-copper-manganese-cerium oxide powder (catalyst 8) was prepared in the same manner as in Experimental Example 3, except that silver nitrate in Experimental Example 3 was changed to 3.04 g of copper nitrate trihydrate. When the catalyst 8 was subjected to the x-ray diffraction measurement in the same conditions as those of Experimental Example 1, it was found that merely a peak showing the fluorite type crystal structure of cerium dioxide and a peak showing the structure of tricobalt tetroxide were detected, and no crystal peaks derived from copper and manganese were observed. Therefore, it was confirmed that manganese existed in the form of an evenly and densely mixed manganese-cerium oxide. In addition, the specific surface area of the catalyst 8 measured by BET method was 73 $m^2/g$.

Experimental Example 9

A nickel-silver-manganese-cerium oxide powder (catalyst 9) was prepared in the same manner as that in Experimental Example 3, except that cobalt nitrate hexahydrate in Experimental Example 3 was changed to 27.3 g of nickel nitrate hexahydrate. When the catalyst 9 was subjected to the x-ray diffraction measurement in the same conditions as those of Experimental Example 1, it was found that merely a peak showing the fluorite type crystal structure of cerium dioxide and a peak showing the structure of nickel oxide were detected. Therefore, no crystal peaks derived from silver and manganese were observed and it was confirmed that manganese existed in the form of an evenly and densely mixed manganese-cerium oxide. In addition, the specific surface area of the catalyst 9 measured by BET method was 47 $m^2/g$.

Experimental Example 10

For the catalyst 3 prepared in Experimental Example 3, using cesium hydroxide, an aqueous impregnation solution in the same volume as that of the amount of water absorbable by the dried catalyst was prepared in such a manner that the aqueous impregnation solution contained 1% by mass in terms of cesium. The catalyst 3 was evenly impregnated with the aqueous solution. After the impregnation, the catalyst was dried at 150° C. overnight to obtain a cobalt-silver-evenly and densely mixed manganese-cerium oxide modified with 1% by mass of cesium (catalyst 10).

Experimental Example 11

For the catalyst 3 prepared in Experimental Example 3, using cesium hydroxide, an aqueous impregnation solution in the same volume as that of the amount of water absorbable by the dried catalyst was prepared in such a manner that the aqueous impregnation solution contained 0.5% by mass in terms of cesium. The catalyst 3 was evenly impregnated with the aqueous solution. After the impregnation, the catalyst was dried at 150° C. overnight to obtain a cobalt-silver-evenly and densely mixed manganese-cerium oxide modified with 0.5% by mass of cesium (catalyst 11).

Experimental Example 12

For the catalyst 3 prepared in Experimental Example 3, using cesium hydroxide, an aqueous impregnation solution in the same volume as that of the amount of water absorbable by the dried catalyst was prepared in such a manner that the aqueous impregnation solution contained 2% by mass in terms of cesium. The catalyst 3 was evenly impregnated with the aqueous solution. After the impregnation, the catalyst was dried at 150° C. overnight to obtain a cobalt-silver-evenly and densely mixed manganese-cerium oxide modified with 2% by mass of cesium (catalyst 12).

Experimental Example 13

For the catalyst 3 prepared in Experimental Example 3, using cesium hydroxide, an aqueous impregnation solution in the same volume as that of the amount of water absorbable by the dried catalyst was prepared in such a manner that the aqueous impregnation solution contained 5% by mass in terms of cesium. The catalyst 3 was evenly impregnated with the aqueous solution. After the impregnation, the catalyst was dried at 150° C. overnight to obtain a cobalt-silver-evenly and densely mixed manganese-cerium oxide modified with 5% by mass of cesium (catalyst 13).

Experimental Example 14

For the catalyst 3 prepared in Experimental Example 3, using cesium hydroxide, an aqueous impregnation solution in the same volume as that of the amount of water absorbable by the dried catalyst was prepared in such a manner that the aqueous impregnation solution contained 10% by mass in terms of cesium. The catalyst 3 was evenly impregnated with the aqueous solution. After the impregnation, the catalyst was dried at 150° C. overnight to obtain a cobalt-silver-evenly and densely mixed manganese-cerium oxide modified with 10% by mass of cesium (catalyst 14).

Experimental Example 15

For the catalyst 3 prepared in Experimental Example 3, using potassium hydroxide, an aqueous impregnation solution in the same volume as that of the amount of water absorbable by the dried catalyst was prepared in such a manner that the aqueous impregnation solution contained 1% by mass in terms of potassium. The catalyst 3 was evenly impregnated with the aqueous solution. After the impregnation, the catalyst was dried at 150° C. overnight to obtain a cobalt-silver-evenly and densely mixed manganese-cerium oxide modified with 1% by mass of potassium (catalyst 15).

Experimental Example 16

For the catalyst 3 prepared in Experimental Example 3, using barium acetate, an aqueous impregnation solution in the same volume as that of the amount of water absorbable by the dried catalyst was prepared in such a manner that the aqueous impregnation solution contained 1% by mass in terms of barium. The catalyst 3 was evenly impregnated with the aqueous solution. After the impregnation, the catalyst was dried at 150° C. overnight to obtain a cobalt-silver-evenly and densely mixed manganese-cerium oxide modified with 1% by mass of barium (catalyst 16).

Experimental Example 17

An aqueous solution of manganese-silver-cobalt-lanthanum was prepared by adding 6.6 g of manganese nitrate hexahydrate, 0.98 g of silver nitrate, 8.4 g of cobalt nitrate hexahydrate and 24.9 g of lanthanum nitrate hexahydrate to 1000 mL of pure water. Next, while an aqueous TMAH solution, which was obtained by adding pure water to 500 g of an aqueous TMAH solution of 25% by mass to dilute the solution to a liquid amount of about 3 L, being violently stirred, the aqueous solution of manganese-silver-cobalt-lanthanum was slowly added dropwise thereto. On completion of the dropwise addition, the mixture was continuously stirred for about 30 minutes for aging. The obtained precipitate was filtered by using a Buchner funnel, washed with pure water and thereafter dried at 110° C. The dried material was pulverized, and thereafter fired at 400° C. for 1 hour and further fired at 650° C. for 2 hours in atmospheric air to obtain a manganese-silver-cobalt-lanthanum composite oxide (catalyst 17). When the catalyst 17 was subjected to the x-ray diffraction measurement in the same conditions as those of Experimental Example 1, it was found that the catalyst 17 was a composite oxide having a perovskite type structure. In addition, the specific surface area of the catalyst 17 measured by BET method was 18 $m^2/g$.

Production Example of Ammonia-Decomposing Catalytic Component

Experimental Example 18

A uniform aqueous solution was prepared by adding 34.92 g of cobalt nitrate hexahydrate, 5.21 g of cerium nitrate hexahydrate and 5.91 g of Zircosol (registered trade mark) ZN (an aqueous zirconium oxynitrate solution manufactured by Daiichi Kigenso Kagaku Kogyo Co., Ltd.; containing 25% by mass as zirconium oxide) to 500 mL of distilled water, followed by mixing. While being stirred, the solution was added dropwise to a solution obtained by dissolving 44.3 g of potassium hydroxide in 500 mL of distilled water to produce a precipitate. The obtained precipitate was filtered, washed with water and dried at 120° C. overnight. Thereafter, the dried solid was pulverized, packed in a tubular furnace and reduced with 10% by volume of hydrogen gas (diluted with nitrogen) at 450° C. for 1 hour to obtain a cobalt-supporting ceria-zirconia (catalyst 18). The specific surface area of the catalyst 18 measured by BET method was 52 $m^2/g$.

Experimental Example 19

A cobalt-supporting ceria-zirconia (catalyst 19) was obtained in the same manner as in Experimental Example 18, except that the amount of cerium nitrate hexahydrate used was changed to 17.4 g, the amount of Zircosol (registered trade mark) ZN (an aqueous zirconium oxynitrate solution manufactured by Daiichi Kigenso Kagaku Kogyo Co., Ltd.; containing 25% by mass as zirconium oxide) used was changed to 19.7 g, and the amount of potassium hydroxide used was changed to 69.1 g in Experimental Example 18. The specific surface area of the catalyst 19 measured by BET method was 83 $m^2/g$.

Experimental Example 20

A cobalt-supporting ceria-zirconia (catalyst 20) was obtained in the same manner as in Experimental Example 18, except that the amount of cerium nitrate hexahydrate used was changed to 2.6 g, the amount of Zircosol (registered trade mark) ZN (an aqueous zirconium oxynitrate solution manufactured by Daiichi Kigenso Kagaku Kogyo Co., Ltd.; containing 25% by mass as zirconium oxide) used was changed to 2.96 g, and the amount of potassium hydroxide used was changed to 39.0 g in Experimental Example 18. The specific surface area of the catalyst 20 measured by BET method was 46 $m^2/g$.

Experimental Example 21

A nickel-supporting ceria-zirconia (catalyst 21) was obtained in the same manner as in Experimental Example 18, except that 34.92 g of cobalt nitrate hexahydrate was changed to 34.89 g of nickel nitrate hexahydrate in Experimental Example 18. The specific surface area of the catalyst 21 measured by BET method was 60 $m^2/g$.

Experimental Example 22

An iron-supporting ceria-zirconia (catalyst 22) was obtained in the same manner as in Experimental Example 18, except that 34.92 g of cobalt nitrate hexahydrate was changed to 48.48 g of iron nitrate nonahydrate in Experimental Example 18. The specific surface area of the catalyst 22 measured by BET method was 30 m²/g.

Experimental Example 23

An aqueous solution of cobalt-lanthanum was prepared by adding 14.6 g of cobalt nitrate hexahydrate and 21.7 g of lanthanum nitrate hexahydrate to 400 mL of pure water. While an aqueous TMAH solution, which was obtained by adding pure water to 110 g of an aqueous TMAH solution of 25% by mass to dilute the solution to a liquid amount of about 2 L, being violently stirred, the aqueous solution of cobalt-lanthanum was slowly added dropwise thereto. On completion of the dropwise addition, the mixture was continuously stirred for about 30 minutes for aging. After the aging, the obtained precipitate was filtered, washed with pure water and thereafter dried at 110° C. The dried material was pulverized, and fired at 400° C. for 1 hour and further fired at 650° C. for 2 hours in atmospheric air to obtain a cobalt-lanthanum composite oxide (catalyst 23). When the catalyst 23 was subjected to the x-ray diffraction measurement in the same conditions as those of Experimental Example 1, it was found that the catalyst 23 was a composite oxide having a perovskite type structure. In addition, the specific surface area of the catalyst 23 measured by BET method was 25 m²/g.

Experimental Example 24

A nickel-lanthanum composite oxide (catalyst 24) was obtained in the same manner as in Experimental Example 23, except that cobalt nitrate hexahydrate was changed to 14.6 g of nickel nitrate hexahydrate in Experimental Example 23. When the catalyst 24 was subjected to the x-ray diffraction measurement in the same conditions as those of Experimental Example 1, it was found that the catalyst 24 was a composite oxide having a perovskite type structure. In addition, the specific surface area of the catalyst 24 measured by BET method was 23 m²/g.

Experimental Example 25

For the catalyst 18 prepared in Experimental Example 18, using cesium nitrate, an aqueous impregnation solution in the same volume as that of the amount of water absorbable by the dried catalyst was prepared in such a manner that the aqueous impregnation solution contained 1% by mass in terms of cesium. The catalyst 18 was evenly impregnated with the aqueous solution. After the impregnation, the catalyst was dried at 150° C. overnight. Thereafter, the dried solid was pulverized, and packed in a tubular furnace and reduced with 10% by volume of hydrogen gas (diluted with nitrogen) at 600° C. for 1 hour to obtain a cobalt-supporting ceria-zirconia modified with 1% by mass of cesium (catalyst 25).

Experimental Example 26

A cobalt-supporting ceria-zirconia modified with 0.5% by mass of cesium (catalyst 26) was obtained in the same manner as in Experimental Example 25, except that, using cesium nitrate for the catalyst 18 prepared in Experimental Example 18, an aqueous impregnation solution in the same volume as that of the amount of water absorbable by the dried catalyst was prepared in such a manner that the aqueous impregnation solution contained 0.5% by mass in terms of cesium.

Experimental Example 27

A cobalt-supporting ceria-zirconia modified with 2% by mass of cesium (catalyst 27) was obtained in the same manner as in Experimental Example 25, except that, using cesium nitrate for the catalyst 18 prepared in Experimental Example 18, an aqueous impregnation solution in the same volume as that of the amount of water absorbable by the dried catalyst was prepared in such a manner that the aqueous impregnation solution contained 2% by mass in terms of cesium.

Experimental Example 28

A cobalt-supporting ceria-zirconia modified with 4% by mass of cesium (catalyst 28) was obtained in the same manner as in Experimental Example 25, except that, using cesium nitrate for the catalyst 18 prepared in Experimental Example 18, an aqueous impregnation solution in the same volume as that of the amount of water absorbable by the dried catalyst was prepared in such a manner that the aqueous impregnation solution contained 4% by mass in terms of cesium.

Experimental Example 29

A cobalt-supporting ceria-zirconia modified with 6% by mass of cesium (catalyst 29) was obtained in the same manner as in Experimental Example 25, except that, using cesium nitrate for the catalyst 18 prepared in Experimental Example 18, an aqueous impregnation solution in the same volume as that of the amount of water absorbable by the dried catalyst was prepared in such a manner that the aqueous impregnation solution contained 6% by mass in terms of cesium.

Experimental Example 30

A cobalt-supporting ceria-zirconia modified with 10% by mass of cesium (catalyst 30) was obtained in the same manner as in Experimental Example 25, except that, using cesium nitrate for the catalyst 18 prepared in Experimental Example 18, an aqueous impregnation solution in the same volume as that of the amount of water absorbable by the dried catalyst was prepared in such a manner that the aqueous impregnation solution contained 10% by mass in terms of cesium.

Experimental Example 31

A cobalt-supporting ceria-zirconia modified with 1% by mass of potassium (catalyst 31) was obtained in the same manner as in Experimental Example 25, except that, using potassium nitrate for the catalyst 18 prepared in Experimental Example 18, an aqueous impregnation solution in the same volume as that of the amount of water absorbable by the dried catalyst was prepared in such a manner that the aqueous impregnation solution contained 1% by mass in terms of potassium.

Experimental Example 32

A cobalt-supporting ceria-zirconia modified with 1% by mass of barium (catalyst 32) was obtained in the same manner as in Experimental Example 25, except that, using barium nitrate for the catalyst 18 prepared in Experimental Example 18, an aqueous impregnation solution in the same volume as that of the amount of water absorbable by the dried catalyst was prepared in such a manner that the aqueous impregnation solution contained 1% by mass in terms of barium.

Experimental Example 33

For the catalyst 21 prepared in Experimental Example 21, using cesium nitrate, an aqueous impregnation solution in the same volume as that of the amount of water absorbable by the dried catalyst was prepared in such a manner that the aqueous impregnation solution contained 1% by mass in terms of barium. The catalyst 21 was evenly impregnated with the aqueous solution. After the impregnation, the catalyst was dried at 150° C. overnight. The dried material was pulverized, and packed in a tubular furnace and reduced with 10% by volume of hydrogen gas (diluted with nitrogen) at 600° C. for 1 hour to obtain a nickel-supporting ceria-zirconia modified with 1% by mass of barium (catalyst 33).

Experimental Example 34

For the catalyst 23 prepared in Experimental Example 23, using cesium nitrate, an aqueous impregnation solution in the same volume as that of the amount of water absorbable by the dried catalyst was prepared in such a manner that the aqueous impregnation solution contained 5% by mass in terms of barium. The catalyst 23 was evenly impregnated with the aqueous solution. After the impregnation, the catalyst was dried at 150° C. overnight. The dried material was pulverized, and packed in a tubular furnace and reduced with 10% by volume of hydrogen gas (diluted with nitrogen) at 600° C. for 1 hour to obtain a cobalt-lanthanum composite oxide modified with 5% by mass of barium (catalyst 34).

(Hydrogen Production Reaction)

Using a quartz reaction tube of 10 mmϕ, the ammonia-combusting catalytic components prepared in Experimental Examples 1 to 17 and the ammonia-decomposing catalytic components prepared in Experimental Examples 18 to 34, and ammonia with purity of 99.9% by volume or higher and air at a molar ratio of oxygen/ammonia of 0.156, hydrogen production reaction by ammonia decomposition was carried out.

The hydrogen production reaction by decomposition of ammonia was carried out by supplying the reaction gas heated to 200° C. to the catalyst layer at $SV=36,000\,h^{-1}$ under normal pressure. The gas at the outlet of the catalyst layer was analyzed to measure the hydrogen yield. The measurement results of the hydrogen yield are shown in Table 1. Table 1 also shows the highest temperature of the catalyst layer in each test.

Reaction Examples 1 to 14

The hydrogen production reaction by ammonia decomposition was carried out by filling the outlet side of the reaction tube in the gas flow direction with the catalyst 25 and changing the catalyst packed in the inlet side of the reaction tube in the gas flow direction to each of the catalysts 1 to 14. The packing amount of the catalyst was adjusted to 1 mL of the ammonia-combusting catalytic component in the inlet side in the gas flow direction and 4 mL of the ammonia-decomposing catalytic component in the outlet side. The reaction conditions were as described above. The measurement results of the hydrogen yield and the highest temperature of the catalyst layer are shown in Table 1.

Reaction Examples 15 to 19

The hydrogen production reaction by ammonia decomposition was carried out by filling the inlet side of the reaction tube in the gas flow direction with the catalyst 10 and changing the catalyst packed in the outlet side of the reaction tube in the gas flow direction to each of the catalysts 26 to 30. The packing amount of the catalyst was adjusted to 1 mL of the ammonia-combusting catalytic component in the inlet side in the gas flow direction and 4 mL of the ammonia-decomposing catalytic component in the outlet side. The reaction conditions were as described above. The measurement results of the hydrogen yield and the highest temperature of the catalyst layer are shown in Table 1.

Reaction Examples 20 to 22

The hydrogen production reaction by ammonia decomposition was carried out by filling the outlet side of the reaction tube in the gas flow direction with the catalyst 25 and changing the catalyst packed in the inlet side of the reaction tube in the gas flow direction to each of the catalysts 15 to 17. The packing amount of the catalyst was adjusted to 1 mL of the ammonia-combusting catalytic component in the inlet side in the gas flow direction and 4 mL of the ammonia-decomposing catalytic component in the outlet side. The reaction conditions were as described above. The measurement results of the hydrogen yield and the highest temperature of the catalyst layer are shown in Table 2.

Reaction Examples 23 to 33

The hydrogen production reaction by ammonia decomposition was carried out by filling the inlet side of the reaction tube in the gas flow direction with the catalyst 10 and changing the catalyst packed in the outlet side of the reaction tube in the gas flow direction to each of the catalysts 18 to 24 and 31 to 34. The packing amount of the catalyst was adjusted to 1 mL of the ammonia-combusting catalytic component in the inlet side in the gas flow direction and 4 mL of the ammonia-decomposing catalytic component in the outlet side. The reaction conditions were as described above. The measurement results of the hydrogen yield and the highest temperature of the catalyst layer are shown in Table 2.

Reaction Example 34

The hydrogen production reaction by ammonia decomposition was carried out by physically and evenly mixing 1 mL of the catalyst 3 and 4 mL of the catalyst 25. The reaction conditions were as described above. The measurement results of the hydrogen yield and the highest temperature of the catalyst layer are shown in Table 2.

TABLE 1

| Reaction Example | Catalyst in front stage | Catalyst in rear stage | Hydrogen yield (%) | Highest temperature of catalyst layer (° C.) |
|---|---|---|---|---|
| Reaction Example 1 | catalyst 1 | catalyst 25 | 91.7 | 860 |
| Reaction Example 2 | catalyst 2 | catalyst 25 | 91.7 | 863 |
| Reaction Example 3 | catalyst 3 | catalyst 25 | 93.8 | 708 |
| Reaction Example 4 | catalyst 4 | catalyst 25 | 92.7 | 701 |
| Reaction Example 5 | catalyst 5 | catalyst 25 | 94.6 | 681 |
| Reaction Example 6 | catalyst 6 | catalyst 25 | 94.9 | 675 |
| Reaction Example 7 | catalyst 7 | catalyst 25 | 94.4 | 687 |
| Reaction Example 8 | catalyst 8 | catalyst 25 | 93.4 | 710 |
| Reaction Example 9 | catalyst 9 | catalyst 25 | 94.0 | 714 |
| Reaction Example 10 | catalyst 10 | catalyst 25 | 96.3 | 640 |
| Reaction Example 11 | catalyst 11 | catalyst 25 | 96.0 | 647 |
| Reaction Example 12 | catalyst 12 | catalyst 25 | 96.4 | 638 |
| Reaction Example 13 | catalyst 13 | catalyst 25 | 95.7 | 655 |
| Reaction Example 14 | catalyst 14 | catalyst 25 | 95.0 | 671 |

TABLE 1-continued

| Reaction Example | Catalyst in front stage | Catalyst in rear stage | Hydrogen yield (%) | Highest temperature of catalyst layer (° C.) |
|---|---|---|---|---|
| Reaction Example 15 | catalyst 10 | catalyst 26 | 95.8 | 640 |
| Reaction Example 16 | catalyst 10 | catalyst 27 | 96.3 | 640 |
| Reaction Example 17 | catalyst 10 | catalyst 28 | 96.2 | 640 |
| Reaction Example 18 | catalyst 10 | catalyst 29 | 95.8 | 640 |
| Reaction Example 19 | catalyst 10 | catalyst 30 | 93.0 | 640 |

TABLE 2

| Reaction Example 20 | catalyst 15 | catalyst 25 | 96.3 | 642 |
| Reaction Example 21 | catalyst 16 | catalyst 25 | 96.1 | 644 |
| Reaction Example 22 | catalyst 17 | catalyst 25 | 92.8 | 753 |
| Reaction Example 23 | catalyst 10 | catalyst 18 | 95.3 | 640 |
| Reaction Example 24 | catalyst 10 | catalyst 19 | 90.4 | 640 |
| Reaction Example 25 | catalyst 10 | catalyst 20 | 93.7 | 640 |
| Reaction Example 26 | catalyst 10 | catalyst 21 | 93.1 | not measured |
| Reaction Example 27 | catalyst 10 | catalyst 22 | 88.2 | not measured |
| Reaction Example 28 | catalyst 10 | catalyst 23 | 84.9 | not measured |
| Reaction Example 29 | catalyst 10 | catalyst 24 | 88.2 | not measured |
| Reaction Example 30 | catalyst 10 | catalyst 31 | 96.3 | not measured |
| Reaction Example 31 | catalyst 10 | catalyst 32 | 96.0 | not measured |
| Reaction Example 32 | catalyst 10 | catalyst 33 | 93.4 | not measured |
| Reaction Example 33 | catalyst 10 | catalyst 34 | 93.0 | not measured |
| Reaction Example 34 | catalyst 3 + catalyst 25 | | 84.3 | 662 |

Production Example of Noble Metal-Based Ammonia-Combusting Catalytic Component

Experimental Example 35

A dinitrodiammineplatinum nitrate solution with a platinum content of 8.19% by mass in an amount of 4.37 g and a dinitrodiamminepalladium nitrate solution with a palladium content of 14.03% by mass in an amount of 1.20 g were mixed, and 10 g of a γ-alumina carrier (BET specific surface area of 58.5 m²/g) was evenly impregnated with the mixed solution to prepare a material containing 3.4% by mass in terms of platinum and 1.6% by mass in terms of palladium. Then, the obtained material was dried at 90° C. to 120° C. Thereafter, the dried material was fired at 500° C. for 1 hour and then reduced at 450° C. for 2 hours with hydrogen to obtain γ-alumina supporting 3.4% by mass of platinum-1.6% by mass of palladium (catalyst 35).

Production Example of Ammonia-Decomposing Catalytic Component

Experimental Example 36

A uniform aqueous solution was prepared by adding 34.92 g of cobalt nitrate hexahydrate, 5.21 g of cerium nitrate hexahydrate and 5.91 g of Zircosol (registered trade mark) ZN (an aqueous zirconium oxynitrate solution manufactured by Daiichi Kigenso Kagaku Kogyo Co., Ltd.; containing 25% by mass as zirconium oxide) to 500 mL of distilled water, followed by mixing. While being stirred, the solution was added dropwise to a solution obtained by dissolving 88.6 g of potassium hydroxide in 500 mL of distilled water to produce a precipitate. The obtained precipitate was filtered, washed with water and dried at 120° C. overnight. Thereafter, the dried solid was pulverized, packed in a tubular furnace and reduced with 10% by volume of hydrogen gas (diluted with nitrogen) at 450° C. for 1 hour to obtain a cobalt-supporting ceria-zirconia catalyst (catalyst 36).

Experimental Example 37

For the catalyst 36, using cesium nitrate, an aqueous impregnation solution in the same volume as that of the amount of water absorbable by the dried catalyst was prepared in such a manner that the aqueous impregnation solution contained 1% by mass in terms of cesium. The catalyst was evenly impregnated with the aqueous solution. Hydrogen treatment at 600° C. was carried out for 1 hour to obtain a cobalt-supporting ceria-zirconia catalyst modified with cesium (catalyst 37).

Experimental Example 38

For the catalyst 36, using potassium nitrate, an aqueous impregnation solution in the same volume as that of the amount of water absorbable by the dried catalyst was prepared in such a manner that the aqueous impregnation solution contained 1% by mass in terms of potassium. The catalyst was evenly impregnated with the aqueous solution. Hydrogen treatment at 600° C. was carried out for 1 hour to obtain a cobalt-supporting ceria-zirconia catalyst modified with potassium (catalyst 38).

Experimental Example 39

For the catalyst 36, using barium nitrate, an aqueous impregnation solution in the same volume as that of the amount of water absorbable by the dried catalyst was prepared in such a manner that the aqueous impregnation solution contained 2% by mass in terms of barium. The catalyst was evenly impregnated with the aqueous solution. Hydrogen treatment at 600° C. was carried out for 1 hour to obtain a cobalt-supporting ceria-zirconia catalyst modified with barium (catalyst 39).

Experimental Example 40

A uniform aqueous solution was prepared by adding 34.9 g of nickel nitrate hexahydrate, 5.21 g of cerium nitrate hexahydrate and 5.91 g of Zircosol (registered trade mark) ZN (an aqueous zirconium oxynitrate solution manufactured by Daiichi Kigenso Kagaku Kogyo Co., Ltd.; containing 25% by mass as zirconium oxide) to 500 mL of distilled water, followed by mixing. While being stirred, the solution was added dropwise to a solution obtained by dissolving 88.9 g of potassium hydroxide in 500 mL of distilled water to produce a precipitate. The obtained precipitate was filtered, washed with water and dried at 120° C. overnight. Thereafter, the dried solid was pulverized, and packed in a tubular furnace and reduced with 10% by volume of hydrogen gas (diluted with nitrogen) at 450° C. for 1 hour to obtain a nickel-supporting ceria-zirconia catalyst (catalyst 40).

Experimental Example 41

For the catalyst 40, using cesium nitrate, an aqueous impregnation solution in the same volume as that of the amount of water absorbable by the dried catalyst was prepared in such a manner that the aqueous impregnation solution contained 1% by mass in terms of cesium. The catalyst was evenly impregnated with the aqueous solution. Hydrogen treatment at 600° C. was carried out for 1 hour to obtain a nickel-supporting ceria-zirconia catalyst modified with cesium (catalyst 41).

Experimental Example 42

An aqueous solution of cobalt-lanthanum was prepared by adding 14.6 g of cobalt nitrate hexahydrate and 21.7 g of lanthanum nitrate hexahydrate to 400 mL of pure water. While an aqueous TMAH solution, which was obtained by adding pure water to 589.1 g of an aqueous TMAH solution of 7.7% by mass to dilute the solution to a liquid amount of about 2 L, being violently stirred, the aqueous solution of cobalt-lanthanum was slowly added dropwise thereto over 1 hour. On completion of the dropwise addition, the mixture was continuously stirred for about 30 minutes for aging. After the aging, the obtained precipitate was filtered, washed with pure water and thereafter dried at 110° C. The dried material was pulverized, and fired at 400° C. for 1 hour and further fired at 650° C. for 2 hours in atmospheric air to obtain a lanthanum-cobalt composite oxide having a perovskite structure (catalyst 42).

Experimental Example 43

For the catalyst 42, using cesium nitrate, an aqueous impregnation solution in the same volume as that of the amount of water absorbable by the dried catalyst was prepared in such a manner that the aqueous impregnation solution contained 5% by mass in terms of cesium. The catalyst was evenly impregnated with the aqueous solution. After the impregnation, the catalyst was dried sufficiently and then hydrogen treatment at 600° C. was carried out for 1 hour to obtain a lanthanum-cobalt composite oxide modified with cesium (catalyst 43).

Experimental Example 44

An aqueous solution of nickel-lanthanum was prepared by adding 11.6 g of nickel nitrate hexahydrate and 17.3 g of lanthanum nitrate hexahydrate to 400 mL of pure water. While an aqueous TMAH solution, which was obtained by adding pure water to 435 g of an aqueous TMAH solution of 7.7% by mass to dilute the solution to a liquid amount of about 2 L, being violently stirred, the aqueous solution of nickel-lanthanum was slowly added dropwise thereto over 1 hour. On completion of the dropwise addition, the mixture was continuously stirred for about 30 minutes for aging. After the aging, the obtained precipitate was filtered, washed with pure water and thereafter dried at 110° C. The dried material was pulverized, and fired at 400° C. for 1 hour and further fired at 650° C. for 2 hours in atmospheric air to obtain a lanthanum-nickel composite oxide having a perovskite structure (catalyst 44).

Experimental Example 45

For the catalyst 44, using cesium nitrate, an aqueous impregnation solution in the same volume as that of the amount of water absorbable by the dried catalyst was prepared in such a manner that the aqueous impregnation solution contained 5% by mass in terms of cesium. The catalyst was evenly impregnated with the aqueous solution. After the impregnation, the catalyst was dried sufficiently and then hydrogen treatment at 600° C. was carried out for 1 hour to obtain a lanthanum-nickel composite oxide modified with cesium (catalyst 45).

Hydrogen Production Reaction

Reaction Examples 35 to 44

Using a quartz reaction tube of 10 mmφ, filling the inlet side of the reaction tube in the gas flow direction with the catalyst 35 (1.5 mL) and changing the catalyst packed in the outlet side to each of the catalysts 36 to 45 (3.5 mL), and using ammonia with purity of 99.9% by volume or higher and air at a molar ratio of oxygen/ammonia of 0.136, hydrogen production reaction by ammonia decomposition was carried out. The temperature of the reaction gas supplied to the ammonia-decomposing catalytic component in the above-mentioned reaction examples was about 935° C. to 950° C.

In addition, as a pretreatment for the catalyst, a reduction reaction was carried out at 600° C. for 1 hour while circulating 10% by volume of hydrogen diluted with nitrogen at 100 mL/minute. And then the hydrogen production reaction was carried out.

After being heated to 200° C., the reaction gas was supplied to the inlet side (the front stage). The reaction pressure was normal pressure and SV=35,250 h$^{-1}$. The hydrogen yield was measured and the results are shown in Table 3.

Reaction Example 45

Reaction was carried out in the same manner as in Reaction Example 35, except that the catalyst 36 in the outlet side was also changed to the catalyst 35 in Reaction Example 35 (comparative example). The results are shown in Table 3.

TABLE 3

| Reaction Example | Catalyst in front stage | Catalyst in rear stage | Hydrogen yield (%) |
|---|---|---|---|
| Reaction Example 35 | catalyst 35 | catalyst 36 | 68.0 |
| Reaction Example 36 | catalyst 35 | catalyst 37 | 91.7 |
| Reaction Example 37 | catalyst 35 | catalyst 38 | 91.0 |
| Reaction Example 38 | catalyst 35 | catalyst 39 | 90.3 |
| Reaction Example 39 | catalyst 35 | catalyst 40 | 64.3 |
| Reaction Example 40 | catalyst 35 | catalyst 41 | 90.5 |
| Reaction Example 41 | catalyst 35 | catalyst 42 | 52.5 |
| Reaction Example 42 | catalyst 35 | catalyst 43 | 82.6 |
| Reaction Example 43 | catalyst 35 | catalyst 44 | 74.4 |
| Reaction Example 44 | catalyst 35 | catalyst 45 | 87.9 |
| Reaction Example 45 (comparative example) | catalyst 35 | catalyst 35 | 3.0 |

Production Example of Catalyst for Production of Hydrogen 2 and Hydrogen Production Example Using Catalyst for Production of Hydrogen 2

Production Example of Catalyst for Production of Hydrogen 2

Experimental Example 46

A uniform aqueous solution was prepared by adding 34.92 g of cobalt nitrate hexahydrate, 5.21 g of cerium nitrate hexahydrate and 5.91 g of Zircosol (registered trade mark) ZN (an aqueous zirconium oxynitrate solution manufactured by Daiichi Kigenso Kagaku Kogyo Co., Ltd.; containing 25% by mass as zirconium oxide) to 500 mL of distilled water, followed by mixing. The solution was added dropwise to a solution obtained by dissolving 88.6 g of potassium hydroxide in 500 mL of distilled water under a stirring condition to produce a precipitate. The obtained precipitate was filtered by using a Buchner funnel, washed with pure water and thereafter dried at 120° C. overnight. Thereafter, the dried solid was pulverized, and packed in a tubular furnace and reduced with 10% by volume of hydrogen gas (diluted with nitrogen) at 450° C. for 1 hour to obtain a cobalt-containing ceria-zirconia catalyst. Next, using cesium nitrate, an aqueous impregnation solution in the same volume as that of the amount of water absorbable by the dried catalyst was prepared in such a manner that the aqueous impregnation solution contained 1% by mass in terms of cesium. The catalyst was evenly impregnated with the aqueous solution. Hydrogen treatment at 600° C. was carried out for 1 hour to obtain a cobalt-containing ceria-zirconia catalyst modified with cesium (catalyst 46).

Experimental Example 47

An aqueous solution of cobalt-lanthanum was prepared by adding 14.6 g of cobalt nitrate hexahydrate and 21.7 g of lanthanum nitrate hexahydrate to 400 mL of pure water. While an aqueous TMAH solution, which was obtained by adding pure water to 589.1 g of an aqueous TMAH solution of 7.7% by mass to dilute the solution to a liquid amount of about 2 L, being violently stirred, the aqueous solution of cobalt-lanthanum was slowly added dropwise thereto over 1 hour. On completion of the dropwise addition, the mixture was continuously stirred for about 30 minutes for aging. The obtained precipitate was filtered by using a Buchner funnel, washed with pure water and thereafter dried at 110° C. The dried material was pulverized, and fired at 400° C. for 1 hour and further fired at 650° C. for 2 hours in atmospheric air to obtain a lanthanum-cobalt composite oxide having a perovskite structure (catalyst 47).

Experimental Example 48

An aqueous solution of nickel-lanthanum was prepared by adding 11.6 g of nickel nitrate hexahydrate and 17.3 g of lanthanum nitrate hexahydrate to 400 mL of pure water. While an aqueous TMAH solution, which was obtained by adding pure water to 471.2 g of an aqueous TMAH solution of 7.7% by mass to dilute the solution to a liquid amount of about 2 L, being violently stirred, the aqueous solution of nickel-lanthanum was slowly added dropwise thereto over 1 hour. On completion of the dropwise addition, the mixture was continuously stirred for about 30 minutes for aging. The obtained precipitate was filtered by using a Buchner funnel, washed with pure water and thereafter dried at 110° C. The dried material was pulverized, and fired at 400° C. for 1 hour and further fired at 650° C. for 2 hours in atmospheric air to obtain a nickel-lanthanum composite oxide having a perovskite structure (catalyst 48).

Experimental Example 49

Cobalt nitrate hexahydrate in an amount of 80.00 g was dissolved in 400.00 g of distilled water. Separately, 48.53 g of ammonium molybdate was gradually added to 250 g of boiling distilled water for dissolution. After the two solutions were mixed, the obtained mixture was heated under a stirring condition to be dried by evaporation. After being dried at 120° C. for 10 hours, the solid material was fired at 350° C. for 5 hours under nitrogen current and fired at 500° C. for 3 hours under air current. When the obtained material was subjected to the x-ray diffraction measurement, it was confirmed as $\alpha$-$CoMoO_4$.

Next, 0.089 g of cesium nitrate was dissolved in 3.23 g of distilled water and the resulting aqueous solution was added dropwise to 6.00 g of the $\alpha$-$CoMoO_4$ for even permeation. After being dried at 90° C. for 10 hours, 0.5 to 1.0 mL of the obtained cesium-containing $\alpha$-$CoMoO_4$ was packed in a reaction tube made of SUS 316. And then a treatment (nitriding treatment) was carried out to obtain a catalyst (catalyst 49) by heating the obtained material to 400° C. under nitrogen flow at 30 to 50 mL/minute, thereafter heating the material to 700° C. under ammonia flow at 50 to 100 mL/minute and keeping the material at 700° C. for 5 hours.

Experimental Example 50

A uniform aqueous solution was prepared by adding 34.89 g of nickel nitrate hexahydrate, 5.21 g of cerium nitrate hexahydrate and 5.91 g of Zircosol (registered trade mark) ZN (an aqueous zirconium oxynitrate solution manufactured by Daiichi Kigenso Kagaku Kogyo Co., Ltd.; containing 25% by mass as zirconium oxide) to 500 mL of distilled water, followed by mixing. The solution was added dropwise to a solution obtained by dissolving 88.6 g of potassium hydroxide in 500 mL of distilled water under a stirring condition to produce a precipitate. The obtained precipitate was filtered by using a Buchner funnel, washed with pure water and dried at 120° C. overnight. Thereafter, the dried solid was pulverized, and packed in a tubular furnace and reduced with 10% by volume of hydrogen gas (diluted with nitrogen) at 450° C. for 1 hour to obtain a nickel-containing ceria-zirconia catalyst. Next, using cesium nitrate, an aqueous impregnation solution in the same volume as that of the amount of water absorbable by the dried catalyst was prepared in such a manner that the aqueous impregnation solution contained 1% by mass in terms of cesium. The catalyst was evenly impregnated with the aqueous solution. Hydrogen treatment was carried out at 600° C. for 1 hour to obtain a nickel-containing ceria-zirconia catalyst modified with cesium (catalyst 50).

Experimental Example 51

Molybdenum trioxide manufactured by Wako Pure Chemical Industries, Ltd. was pressure-molded, pulverized and classified. A reaction tube made of SUS was filled with 0.995 g of the particles with a size of 0.71 to 1.18 mm and then set in a tubular furnace. The reaction tube was heated to 550° C. from room temperature at a heating rate of 20° C./minute and successively heated to 720° C. at a heating rate of 1° C./minute under methane flow at 4 mL/minute and hydrogen flow at 3 mL/minute. Then, the reaction tube was cooled after the circulated gas was changed to 30 mL/minute of nitrogen to obtain a molybdenum carbonate catalyst (catalyst 51).

Experimental Example 52

For the catalyst 47 prepared in Experimental Example 47, using cesium nitrate, an aqueous impregnation solution in the same volume as that of the amount of water absorbable by the dried catalyst was prepared in such a manner that the aqueous impregnation solution contained 5% by mass in terms of cesium. The catalyst was evenly impregnated with the aqueous solution. After the impregnation, the catalyst was dried sufficiently and then hydrogen treatment was carried out at 600° C. for 1 hour to obtain a lanthanum-cobalt composite oxide modified with cesium (catalyst 52).

Experimental Example 53

Firstly, 6.6 g of manganese nitrate hexahydrate, 25.34 g of cobalt nitrate hexahydrate and 1.47 g of silver nitrate were dissolved in distilled water, and 19.55 g of a cerium carbonate powder was added to the obtained aqueous solution. Next, the solution was heated while being stirred by a hot stirrer to obtain a dried solid. The dried solid was dried at 150° C. overnight. Thereafter, the dried solid was pulverized, and fired at 500° C. for 2 hours in atmospheric air to obtain a catalyst (catalyst 53).

Experimental Example 54

For the catalyst 53 prepared in Experimental Example 53, using cesium hydroxide, an aqueous impregnation solution in the same volume as that of the amount of water absorbable by the dried catalyst was prepared in such a manner that the aqueous impregnation solution contained 1% by mass in terms of cesium. The catalyst was evenly impregnated with the aqueous solution. After the impregnation, the catalyst was dried sufficiently to obtain a catalyst (catalyst 54).

Experimental Example 55

A catalyst (catalyst 55) was obtained in the same manner as in Experimental Example 53, except that 1.47 g of silver nitrate was changed to 3.04 g of copper nitrate trihydrate in Experimental Example 53.

Experimental Example 56

A catalyst (catalyst 56) was obtained in the same manner as in Experimental Example 53, except that 25.34 g of cobalt nitrate hexahydrate was changed to 27.25 g of nickel nitrate hexahydrate in Experimental Example 53.

Experimental Example 57

A dinitrodiammineplatinum nitrate solution with a platinum content of 8.19% by mass in an amount of 4.37 g and a dinitrodiamminepalladium nitrate solution with a palladium content of 14.03% by mass in an amount of 1.20 g were mixed, and 10 g of a γ-alumina powder (BET specific surface area of 58.5 m²/g) was evenly impregnated with the mixed solution to prepare a material containing 3.4% by mass in terms of platinum and 1.6% by mass in terms of palladium. Then, the obtained material was dried at 90° C. to 120° C. Thereafter, the dried material was fired at 500° C. for 1 hour and then reduced at 450° C. for 2 hours with hydrogen to obtain γ-alumina supporting 3.4% by mass of platinum-1.6% by mass of palladium (catalyst 57) (comparative example).

Experimental Example 58

A γ-alumina powder (BET specific surface area of 58.5 m²/g) in an amount of 10 g was evenly impregnated with 3.75 g of a dinitrodiamminepalladium nitrate solution with a palladium content of 14.03% by mass to prepare a material which contained 5% by mass in terms of palladium. The obtained material was dried at 90° C. to 120° C. Thereafter, the dried material was fired at 500° C. for 1 hour and then reduced at 450° C. for 2 hours with hydrogen to obtain γ-alumina supporting 5% by mass of palladium (catalyst 58) (comparative example).

Hydrogen Production Reaction

Reaction Examples 46 to 54

Using the catalysts 46 to 52 obtained in Experimental Examples 46 to 52 and the catalysts 57 and 58 obtained in Experimental Examples 57 and 58 (comparative example), and ammonia with purity of 99.9% by volume or higher and air at a molar ratio of oxygen/ammonia of 0.15, the hydrogen production reaction by decomposition of ammonia was carried out (under normal pressure, SV=6,000 h$^{-1}$). The hydrogen yield was measured by changing the reaction temperature. The results are shown in Table 4.

Reaction Examples 55 to 59

Using the catalysts 46 and 53 to 56 obtained in Experimental Examples 46 and 53 to 56, and ammonia with purity of 99.9% by volume or higher and air at a molar ratio of oxygen/ammonia of 0.15, the hydrogen production reaction by decomposition of ammonia was carried out (under normal pressure, SV=18,000 h$^{-1}$). The hydrogen yield was measured by changing the reaction temperature. The results are shown in Table 5.

TABLE 4

| Reaction Example (catalyst) | | | | | | |
|---|---|---|---|---|---|---|
| Reaction Example 46 (catalyst 46) | Reaction temperature (° C.) | 465 | 490 | 530 | 580 | — |
| | Hydrogen yield (%) | 45.2 | 76.6 | 99.5 | 100 | — |
| Reaction Example 47 (catalyst 47) | Reaction temperature (° C.) | 460 | 500 | 545 | 585 | — |
| | Hydrogen yield (%) | 15.9 | 28.1 | 61.5 | 87.9 | — |
| Reaction Example 48 (catalyst 48) | Reaction temperature (° C.) | 490 | 530 | 580 | 640 | — |
| | Hydrogen yield (%) | 41.3 | 66.5 | 88.8 | 98.5 | — |
| Reaction Example 49 (catalyst 49) | Reaction temperature (° C.) | 500 | 600 | 650 | — | — |
| | Hydrogen yield (%) | 9.2 | 83.3 | 98.9 | — | — |
| Reaction Example 50 (catalyst 50) | Reaction temperature (° C.) | 473 | 513 | 532 | 552 | 599 |
| | Hydrogen yield (%) | 40.1 | 65.9 | 79.8 | 91.2 | 100 |
| Reaction Example 51 (catalyst 51) | Reaction temperature (° C.) | 500 | 607 | 658 | — | — |
| | Hydrogen yield (%) | 3.5 | 50.2 | 95.3 | — | — |
| Reaction Example 52 (catalyst 52) | Reaction temperature (° C.) | 504 | 560 | 601 | 616 | — |
| | Hydrogen yield (%) | 46.2 | 84.1 | 99.7 | 100 | — |
| Reaction Example 53 (comparative example) (catalyst 57) | Reaction temperature (° C.) | 407 | 502 | — | — | — |
| | Hydrogen yield (%) | 0.4 | 2.9 | — | — | — |
| Reaction Example 54 (comparative example) (catalyst 58) | Reaction temperature (° C.) | 400 | 500 | 600 | — | — |
| | Hydrogen yield (%) | 0.2 | 1.5 | 7.5 | — | — |

TABLE 5

| Reaction Example (catalyst) | | | | | | |
|---|---|---|---|---|---|---|
| Reaction Example 55 (catalyst 46) | Reaction temperature (° C.) | 442 | 477 | 511 | 544 | 579 |
| | Hydrogen yield (%) | 18.8 | 35.7 | 58.6 | 84.3 | 98.6 |
| Reaction Example 56 (catalyst 53) | Reaction temperature (° C.) | 344 | 476 | 542 | 636 | 752 |
| | Hydrogen yield (%) | 16.0 | 28.1 | 53.8 | 78.1 | 100 |
| Reaction Example 57 (catalyst 54) | Reaction temperature (° C.) | 433 | 494 | 523 | 587 | 741 |
| | Hydrogen yield (%) | 28.6 | 49.5 | 66.4 | 96.1 | 99.4 |
| Reaction Example 58 (catalyst 55) | Reaction temperature (° C.) | 337 | 403 | 495 | 620 | 746 |
| | Hydrogen yield (%) | 18.9 | 24.6 | 36.7 | 82.0 | 100 |
| Reaction Example 59 (catalyst 56) | Reaction temperature (° C.) | 412 | 495 | 605 | 688 | 745 |
| | Hydrogen yield (%) | 13.3 | 20.2 | 62.0 | 85.0 | 100 |

Additionally, the hydrogen yield (%) was calculated according to the following expression.

[Mathematical Expression 1]

$$\text{Hydrogen yield (\%)} = \frac{2 \times \text{Amount of hydrogen generated}}{3 \times ((\text{Amount of ammonia supplied}) - 4/3(\text{Amount of oxygen supplied}))}$$

Production Example of Catalyst for Combustion of Ammonia and Reaction Example of Combustion of Ammonia Using the Catalyst Production Example of Catalyst for Combustion of Ammonia Experimental Example 59

Figure 5:
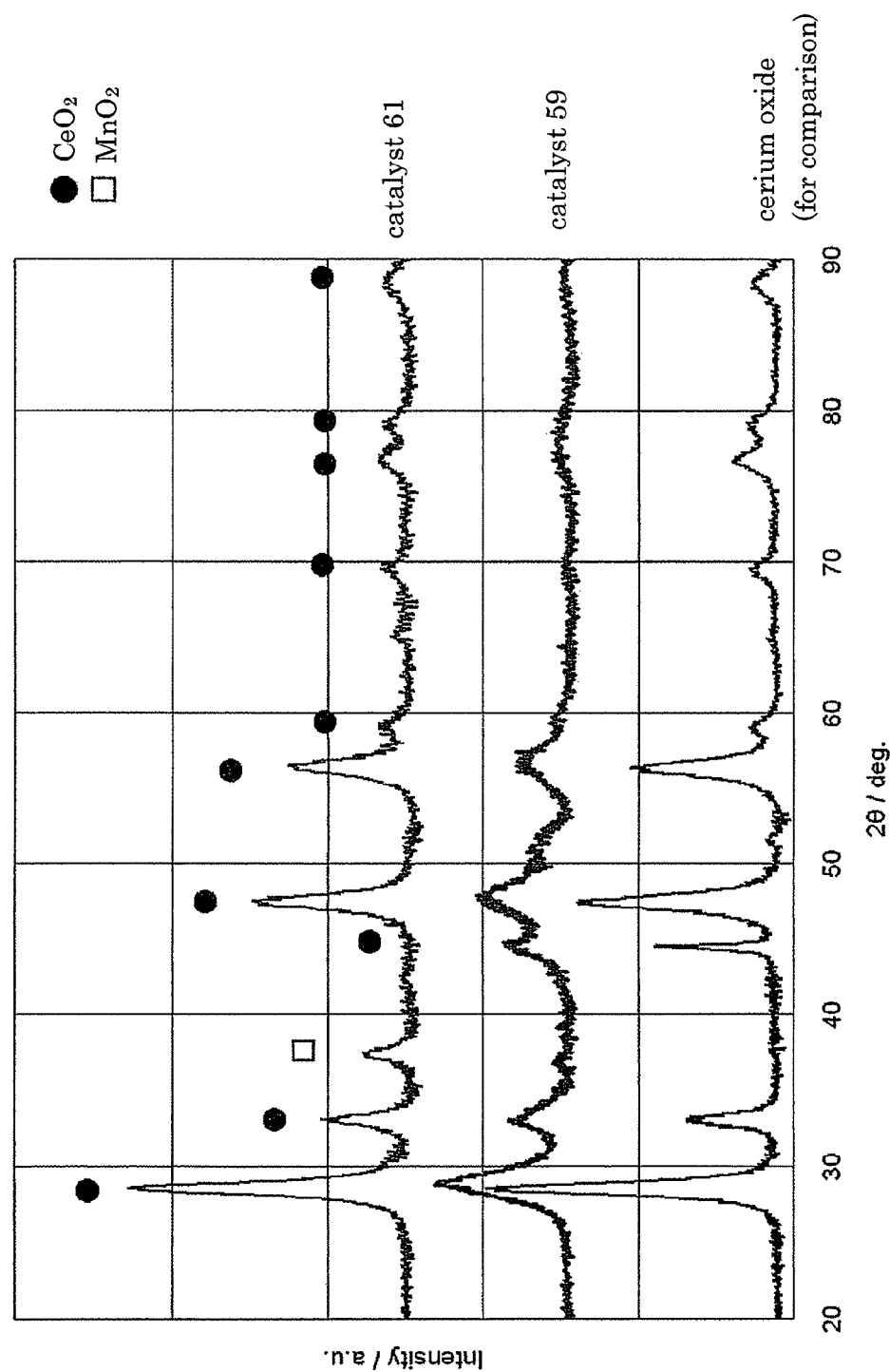
FIG. 5 is an x-ray diffraction measurement view of a manganese-cerium oxide.

Catalyst 59 containing a manganese-cerium oxide and silver was prepared by the following method, according to a solid-liquid mixing method. Powder-formed cerium carbonate, manganese nitrate and silver nitrate were weighed in such a manner that the contents of manganese, cerium and silver in the catalyst 59 became 45% by mass, 45% by mass and 10% by mass in terms of $MnO_2$, $CeO_2$ and $Ag_2O$, respectively. An aqueous manganese nitrate solution and an aqueous silver nitrate solution were added to the powder-formed cerium carbonate, followed by sufficiently mixing. Next, the mixture was dried at 150° C. overnight and fired at 500° C. for 5 hours and thereafter pulverized to obtain catalyst 59 containing a manganese-cerium oxide and silver. When the obtained catalyst 59 was subjected to the x-ray diffraction measurement in the condition of using a CuKa ray source, a voltage of 45 KV, a current of 40 mA, a scanning range of 10 to 90° and a scanning rate of 0.198°/minute, a main peak at the position showing the fluorite type crystal structure of cerium dioxide was detected and no crystal peak derived from manganese was observed (as shown in FIG. 5). Thus, it was confirmed that the above-mentioned manganese-cerium oxide was in the state of an evenly and densely mixed manganese-cerium oxide. Also no crystal peak derived from silver was detected. The specific surface area measured by BET method was 55 $m^2/g$.

Experimental Example 60

Catalyst 60 was prepared in the same manner as in catalyst 59, except that silver nitrate was changed to copper nitrate and the contents of manganese, cerium and copper became 45% by mass, 45% by mass and 10% by mass in terms of $MnO_2$, $CeO_2$ and CuO, respectively, in preparation example of catalyst 59. When the obtained catalyst 60 was subjected to the x-ray diffraction measurement in the condition of using a CuKa ray source, a voltage of 45 KV, a current of 40 mA, a scanning range of 10 to 90° and a scanning rate of 0.198°/minute, a main peak at the position showing the fluorite type crystal structure of cerium dioxide was detected and no crystal peak derived from manganese was observed. Thus it was confirmed that the above-mentioned manganese-cerium oxide was in the state of an evenly and densely mixed manganese-cerium oxide. Also no crystal peak derived from copper was detected. The specific surface area measured by BET method was 65 $m^2/g$.

Experimental Example 61

A cerium dioxide powder was prepared by firing a cerium carbonate powder at 500° C. for 2 hours in atmospheric air. Next, cerium oxide, manganese nitrate and silver nitrate were weighed in such a manner that the contents of manganese, cerium and silver became 45% by mass, 45% by mass and 10% by mass in terms of $MnO_2$, $CeO_2$ and $Ag_2O$, respectively. An aqueous manganese nitrate solution and an aqueous silver nitrate solution were added to a cerium oxide powder, followed by sufficiently mixing. Next, the mixture was dried at 150° C. overnight and fired at 500° C. for 5 hours and thereafter pulverized to obtain catalyst 61 containing a manganese-cerium oxide and silver. When the obtained catalyst 61 was subjected to the x-ray diffraction measurement in the condition of using a CuKa ray source, a voltage of 45 KV, a current of 40 mA, a scanning range of 10 to 90° and a scanning rate of 0.198°/minute, not only a main peak showing the fluorite type crystal structure of cerium dioxide but also a crystal peak derived from manganese dioxide were detected (as shown in FIG. 5). On the other hand, no crystal peak derived from silver was detected. The specific surface area measured by BET method was 41 $m^2/g$.

Experimental Example 62

Catalyst 62 was prepared in the same manner as in catalyst 59, except that no silver nitrate was used and the contents of manganese and cerium were changed to 50% by mass and 50% by mass in terms of $MnO_2$ and $CeO_2$, respectively, in production example of catalyst 59. When the obtained catalyst 62 was subjected to the x-ray diffraction measurement in the condition of using a CuKa ray source, a voltage of 45 KV, a current of 40 mA, a scanning range of 10 to 90° and a scanning rate of 0.198°/minute, a main peak at the position showing the fluorite type crystal structure of cerium dioxide was detected and no crystal peak derived from manganese was observed. Thus, it was confirmed that the above-mentioned manganese-cerium oxide was in the state of an evenly and densely mixed manganese-cerium oxide. The specific surface area measured by BET method was 54 m²/g (comparative example).

Experimental Example 63

Catalyst 63 was obtained in the same manner as in catalyst 59, except that no manganese nitrate was used and the contents of silver and cerium were changed to 10% by mass and 90% by mass in terms of $Ag_2O$ and $CeO_2$, respectively, in production example of catalyst 59. When the obtained catalyst 63 was subjected to the x-ray diffraction measurement in the condition of using a CuKα ray source, a voltage of 45 KV, a current of 40 mA, a scanning range of 10 to 90° and a scanning rate of 0.198°/minute, a main peak at the position showing the fluorite type crystal structure of cerium dioxide was detected and no crystal peak derived from silver was observed. The specific surface area measured by BET method was 23 m²/g (comparative example).

Experimental Example 64

A commercially available alumina powder (specific surface area of 299 m²/g) was impregnated with an aqueous dinitrodiammineplatinum nitrate solution. After being dried sufficiently, the alumina powder was fired in air at 500° C. for 2 hours to obtain catalyst 64 of alumina on which 5% by mass of platinum was supported (reference example).

Experimental Example 65

The cerium oxide powder (specific surface area of 74 m²/g) prepared in production example of catalyst 61 was impregnated with an aqueous palladium nitrate solution. After being dried sufficiently, the powder was fired in air at 500° C. for 2 hours to obtain catalyst 65 of cerium oxide on which 5% by mass of palladium was supported (reference example).

Ammonia Combustion Reaction and Heat Exposure Test

Reaction Examples 60 to 66

Using the catalysts 59 to 65 prepared in the above-mentioned experimental examples, ammonia combustion reaction was carried out by the following procedure. A reaction tube made of SUS with an inner diameter of 10 mm was filled with 0.8 mL of each catalyst and then set in an electric furnace. While reaction gases, ammonia with purity of 99.9% by volume or higher and air, were supplied at 140 mL/minute and 100 mL/minute, respectively, the temperature of the electric furnace was increased, and the starting temperature of ammonia combustion reaction was measured (space velocity 18,000 h⁻¹). The starting temperature of ammonia combustion reaction was measured as follows: the catalyst layer temperature was measured with a thermocouple inserted near the center of the catalyst layer, and the electric furnace temperature at the time point when the catalyst layer temperature was abruptly increased due to the start of ammonia combustion reaction was defined as the starting temperature of ammonia combustion reaction. The results of ammonia combustion reaction are shown in Table 6.

Also, using catalyst 59 and catalyst 63, the heat exposure test was carried out by the following procedure. Catalyst 59 and catalyst 63 were heated at 900° C. for 2 hours in atmospheric air. For the catalysts after the heat treatment, the ammonia combustion reaction was carried out as that described above, and the starting temperature of ammonia combustion was evaluated. The measurement results of the starting temperature of ammonia combustion of catalyst 59 and catalyst 63 after the heat exposure are shown in Table 6.

TABLE 6

| Experimental Example | Catalyst | Starting temperature of combustion (° C.) | Starting temperature of combustion after heat exposure (° C.) |
|---|---|---|---|
| Experimental Example 60 | catalyst 59 | 122 | 172 |
| Experimental Example 61 | catalyst 60 | 129 | — |
| Experimental Example 62 | catalyst 61 | 160 | — |
| Experimental Example 63 (comparative example) | catalyst 62 | 214 | — |
| Experimental Example 64 (comparative example) | catalyst 63 | 140 | 215 |
| Experimental Example 65 (reference example) | catalyst 64 | 115 | — |
| Experimental Example 66 (reference example) | catalyst 65 | 120 | — |

INDUSTRIAL APPLICABILITY

The present invention provides a catalyst for efficiently producing hydrogen by combusting ammonia with the catalyst in the presence of oxygen and directly utilizing the generated heat for ammonia decomposition reaction, as well as a process for producing hydrogen. The obtained hydrogen can be used as a fuel for a fuel cell as well as a device which can obtain energy by combusting hydrogen. Further, by using the catalyst for combustion of ammonia of the present invention, ammonia existing in air or ammonia in a high concentration contained in industrial waste gases, etc., can be combusted and decomposed to water and nitrogen at low temperature, and combustion heat can be obtained as well.

EXPLANATION OF REFERENCE NUMERALS

1: Ammonia-combusting catalytic component
2: Ammonia-decomposing catalytic component
3: Gas containing ammonia and oxygen
4: Reaction gas in a state where temperature thereof is increased by combustion of ammonia, and oxygen therein is substantially completely consumed
5: Gas containing hydrogen and nitrogen

The invention claimed is:
1. A catalyst for production of hydrogen from a gas containing ammonia and oxygen, comprising an ammonia-combusting catalytic component and an ammonia-decomposing catalytic component,
wherein the ammonia-combusting catalytic component contains a manganese-cerium oxide as A component and further contains silver and at least one metal element selected from the group consisting of iron, nickel and cobalt as B component, and the manganese-cerium oxide contains 1 to 60% by mass of manganese in terms of manganese dioxide, or
wherein the ammonia-combusting catalytic component contains a perovskite manganese-lanthanum oxide as A component and the perovskite manganese-lanthanum oxide further contains, silver and at least one metal element selected from the group consisting of iron, nickel and cobalt as C component, in the crystal structure thereof.

2. The catalyst for production of hydrogen according to claim 1, wherein the manganese-cerium oxide contained in the ammonia-combusting catalytic component as A component is a mixed manganese-cerium oxide identified as an oxide having a fluorite structure of cerium dioxide by x-ray diffraction measurement.

3. The catalyst for production of hydrogen according to claim 1, wherein the ammonia-decomposing catalytic component contains at least one element selected from Group 6 to Group 10 in the periodic table.

4. The catalyst for production of hydrogen according to claim 3, wherein the ammonia-decomposing catalytic component is a metal catalyst and/or a metal oxide catalyst containing at least one element selected from Group 6 to Group 10 in the periodic table.

5. The catalyst for production of hydrogen according to claim 3, wherein the ammonia-decomposing catalytic component further contains at least one metal oxide selected from the group consisting of aluminum oxide, titanium oxide, zirconium oxide, cerium oxide, lanthanum oxide, zeolite, magnesium oxide, calcium oxide, barium oxide, yttrium oxide, tungsten oxide, silicon dioxide, silica-alumina and a titanium-based composite oxide as E' component.

6. The catalyst for production of hydrogen according to claim 3, wherein the ammonia-decomposing catalytic component further contains an alkali metal and/or an alkaline earth metal as D' component.

\* \* \* \* \*